United States Patent
Kawamura et al.

(10) Patent No.: US 12,419,319 B2
(45) Date of Patent: Sep. 23, 2025

(54) METHOD FOR PRODUCING HIGH-PROTEIN MILK RAW MATERIAL

(71) Applicant: MEIJI CO., LTD., Tokyo (JP)

(72) Inventors: Yuki Kawamura, Tokyo (JP); Mizue Saito, Tokyo (JP); Hiroshi Echizen, Tokyo (JP)

(73) Assignee: MEIJI CO., LTD., Tokyo (JP)

( * ) Notice: Subject to any disclaimer, the term of this patent is extended or adjusted under 35 U.S.C. 154(b) by 13 days.

(21) Appl. No.: 17/288,165

(22) PCT Filed: Oct. 28, 2019

(86) PCT No.: PCT/JP2019/042228
§ 371 (c)(1),
(2) Date: Apr. 23, 2021

(87) PCT Pub. No.: WO2020/085517
PCT Pub. Date: Apr. 30, 2020

(65) Prior Publication Data
US 2021/0378252 A1    Dec. 9, 2021

(30) Foreign Application Priority Data

Oct. 26, 2018 (JP) .................. 2018-202164

(51) Int. Cl.
*A23C 9/14* (2006.01)
*A23B 11/12* (2025.01)
*A23C 1/04* (2006.01)
*A23J 3/08* (2006.01)

(52) U.S. Cl.
CPC ............ *A23C 9/14* (2013.01); *A23B 11/12* (2025.01); *A23C 1/04* (2013.01); *A23J 3/08* (2013.01)

(58) Field of Classification Search
CPC ..... A23C 9/14; A23C 1/04; A23C 3/02; A23J 3/08
USPC .................................. 426/271, 580
See application file for complete search history.

(56) References Cited

U.S. PATENT DOCUMENTS

| | | | | |
|---|---|---|---|---|
| 2,360,039 A | * | 10/1944 | Buxton | A61K 31/59 554/185 |
| 4,138,506 A | | 2/1979 | Eida et al. | |
| 5,691,165 A | | 11/1997 | Mielsen et al. | |
| 2008/0089986 A1 | | 4/2008 | Song | |
| 2012/0114795 A1 | * | 5/2012 | Havea | A23J 3/08 426/456 |

FOREIGN PATENT DOCUMENTS

| | | |
|---|---|---|
| JP | 56-109549 | 8/1981 |
| JP | 59-21584 | 2/1984 |
| JP | 2-107156 | 4/1990 |
| JP | 9-238614 | 9/1997 |
| JP | 2002-34591 | 2/2002 |
| JP | 2004-201601 | 7/2004 |
| JP | 2006-94856 | 4/2006 |
| JP | 2017-55710 | 3/2017 |
| JP | 2018-74915 | 5/2018 |
| KR | 10-0827389 | 4/2008 |

OTHER PUBLICATIONS

JPH09238614A, Sep. 1997, translation.*
Extended European Search Report issued May 31, 2022 in corresponding European Patent Application No. 19876275.9.
Zhang, Yue et al., "Decolorization of Cheddar Cheese whey by activated carbon", Journal of Dairy Science, vol. 98, No. 5, pp. 2982-2991, 2015.
International Preliminary Report on Patentability and Written Opinion of the International Searching Authority issued Apr. 27, 2021 in International (PCT) Application No. PCT/JP2019/042228.
International Search Report (ISR) issued Jan. 21, 2020 in International (PCT) Application No. PCT/JP2019/042228.
Kayoko Hashimoto et al., "Delicious and convenient high-protein product!—How to use milk protein—", A technical journal on food chemistry & chemicals, vol. 32, No. 3, pp. 58-62, ISSN 0911-2286, Mar. 1, 2016, non-official translation, cited in the ISR.
K. Takatsu et al., "Room Temperature Sulfur Removal from LPG with Adsorbent for Fuel Cell Application—Adsorption Behavior of Sulfur Compounds-", Journal of Japan Petroleum Institute, vol. 50, No. 4, pp. 200-207, 2007, Abstract, cited in the ISR.
Chinese Office Action issued Feb. 22, 2023 in corresponding Chinese Patent Application No. 201980070078.1, with English machine translation.
Office Action issued Nov. 7, 2023 in corresponding Japanese Patent Application No. 2020-552642, with English translation, 14 pages.
Office Action issued Jun. 18, 2024 in Japanese Patent Application No. 2020-552642, with English-language translation.
Decision of Refusal issued Feb. 4, 2025 in the corresponding Japanese Patent Application No. 2020-552642, with English-language translation.
Office Action issued Oct. 2, 2024 in Australian Patent Application No. 2019364074.
Decision of Refusal issued on Aug. 29, 2024 in corresponding Chinese Patent Application No. 201980070078.1, with English-language translation.
Reconsideration Report by Examiner before Appeal Proceedings dated Jul. 25, 2025 in Japanese Patent Application 2020-552642, with English Machine Translation, 15 pages.

* cited by examiner

*Primary Examiner* — Jeffrey P Mornhinweg
(74) *Attorney, Agent, or Firm* — Wenderoth, Lind & Ponack, L.L.P.

(57) ABSTRACT

A high-protein milk raw material having a good flavor is provided. The liquid high-protein milk raw material of the present invention can be produced by preparing a milk fluid from the milk raw material and subjecting the milk fluid to treatment in contact with activated carbon.

24 Claims, 7 Drawing Sheets

[Fig. 1]
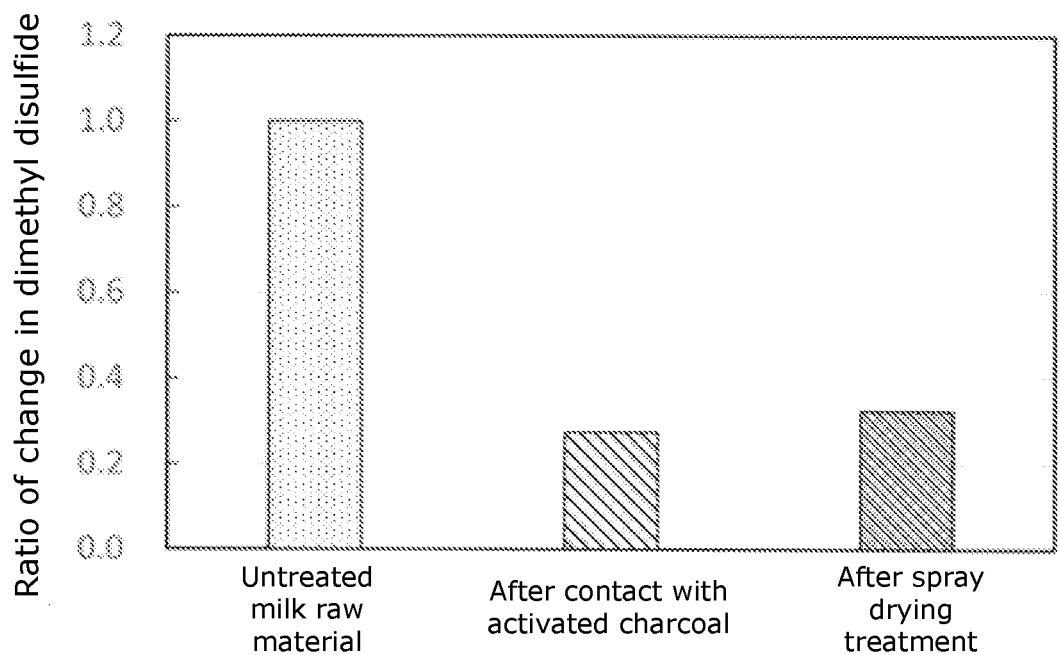
[Fig. 2]
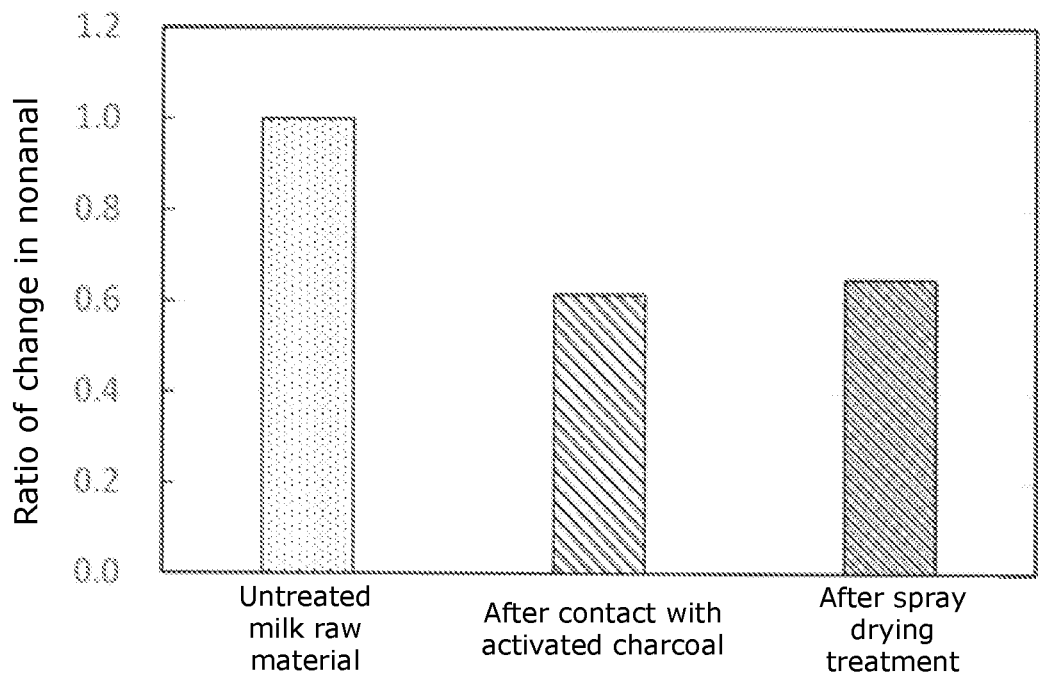

[Fig. 3]
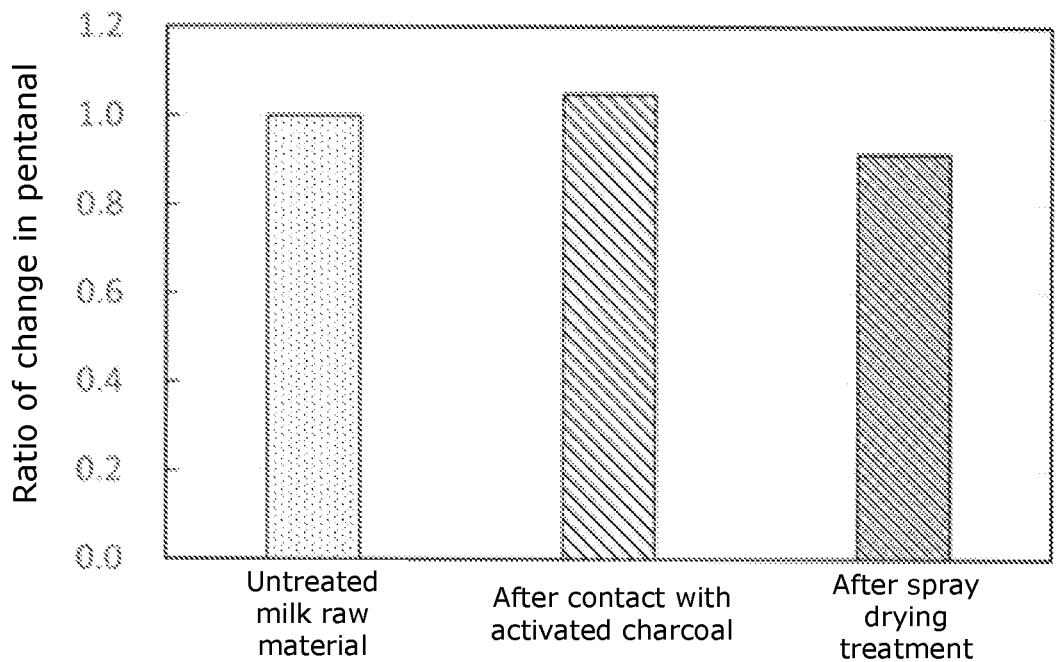
[Fig. 4]
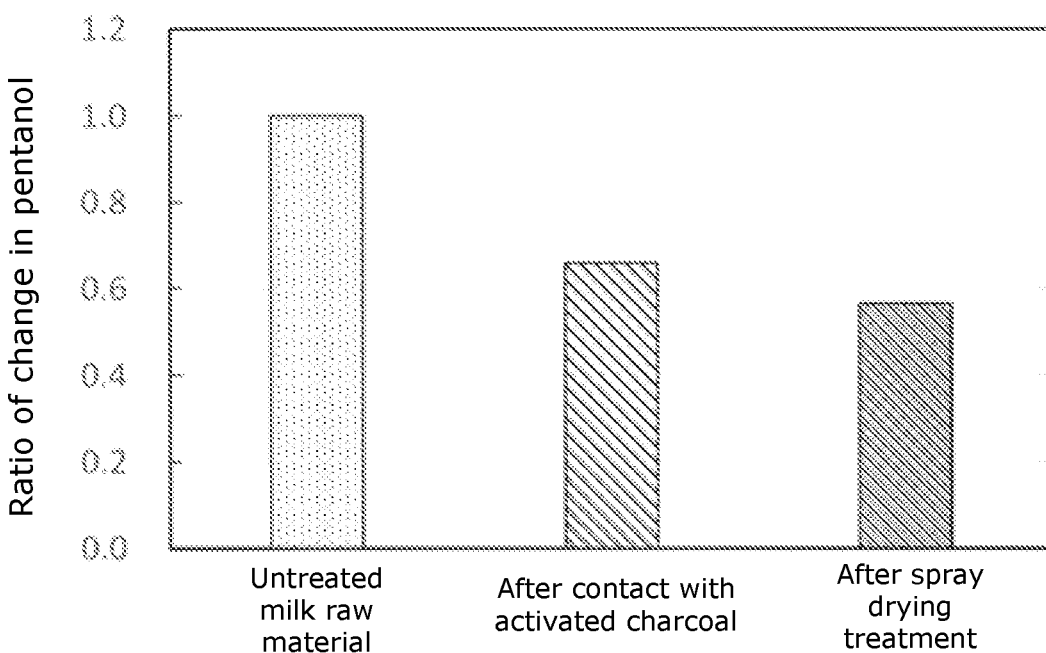

[Fig. 5]
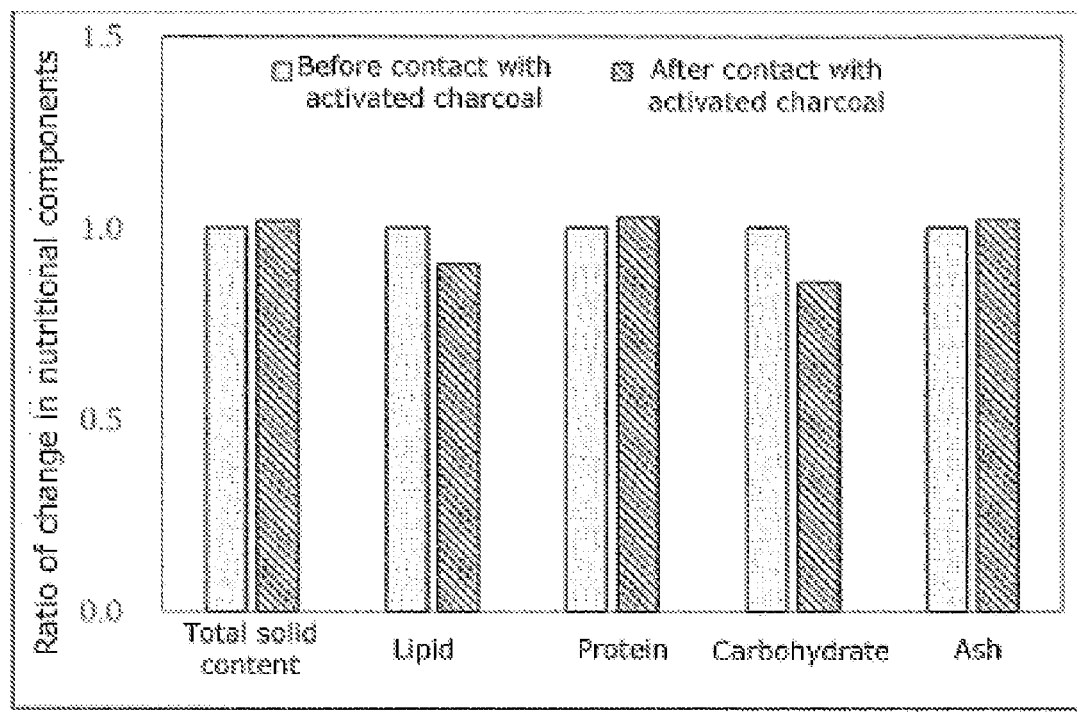
[Fig. 6]
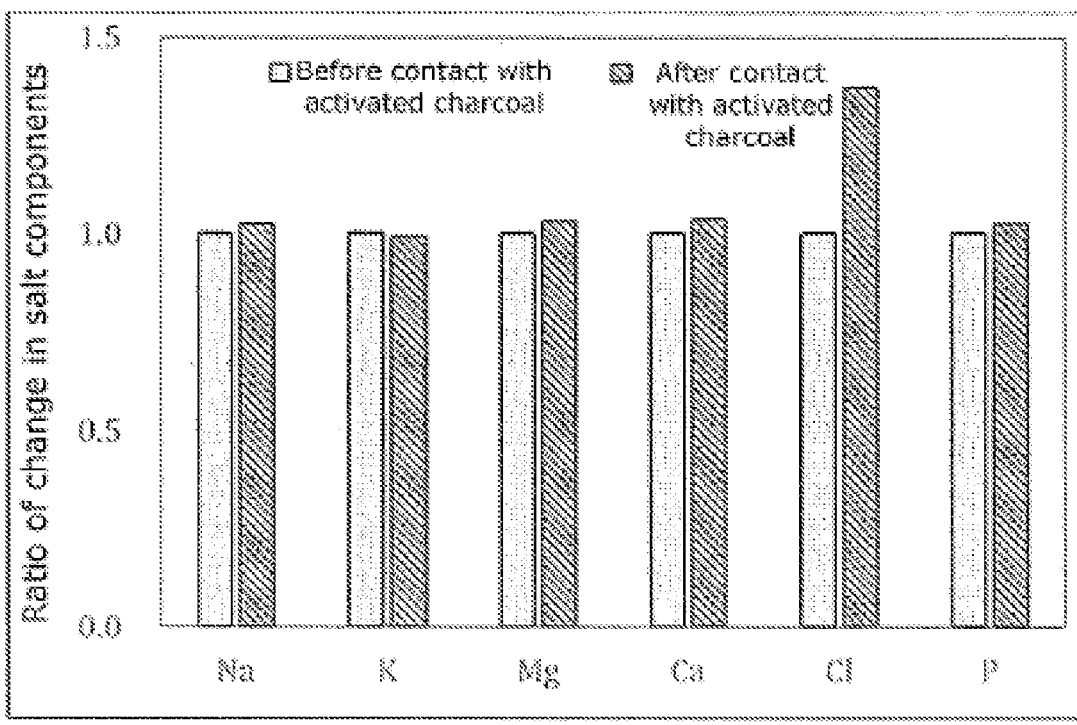

[Fig. 7]
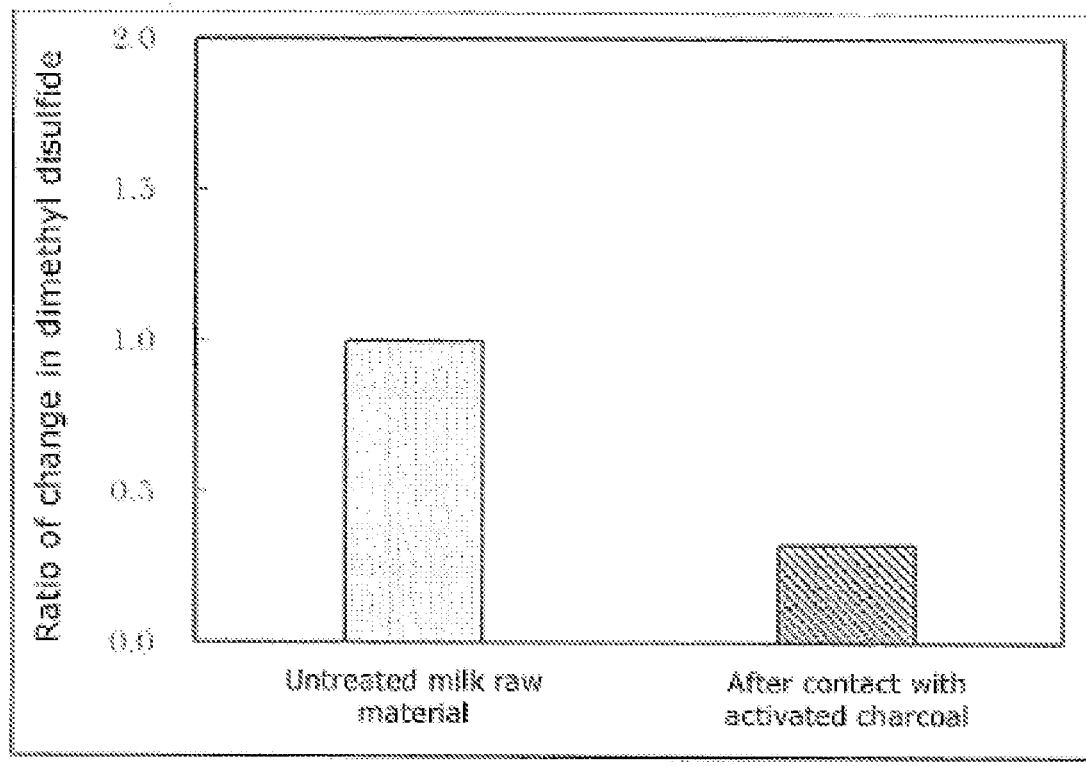
[Fig. 8]
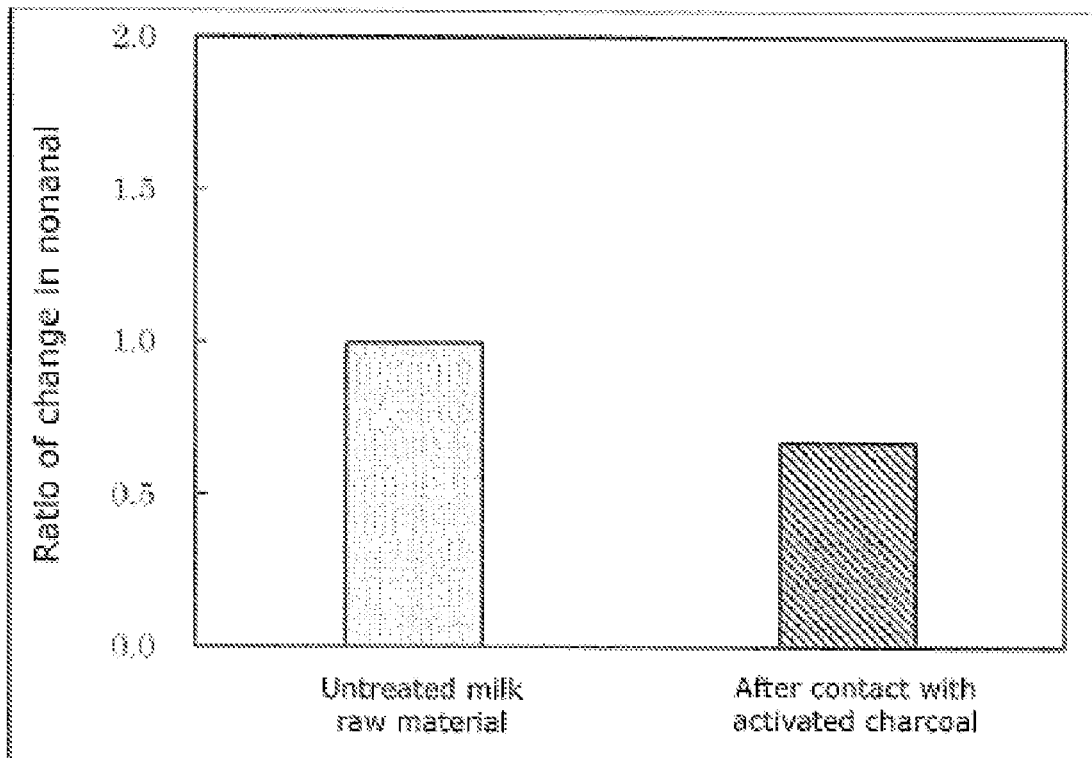

[Fig. 9]
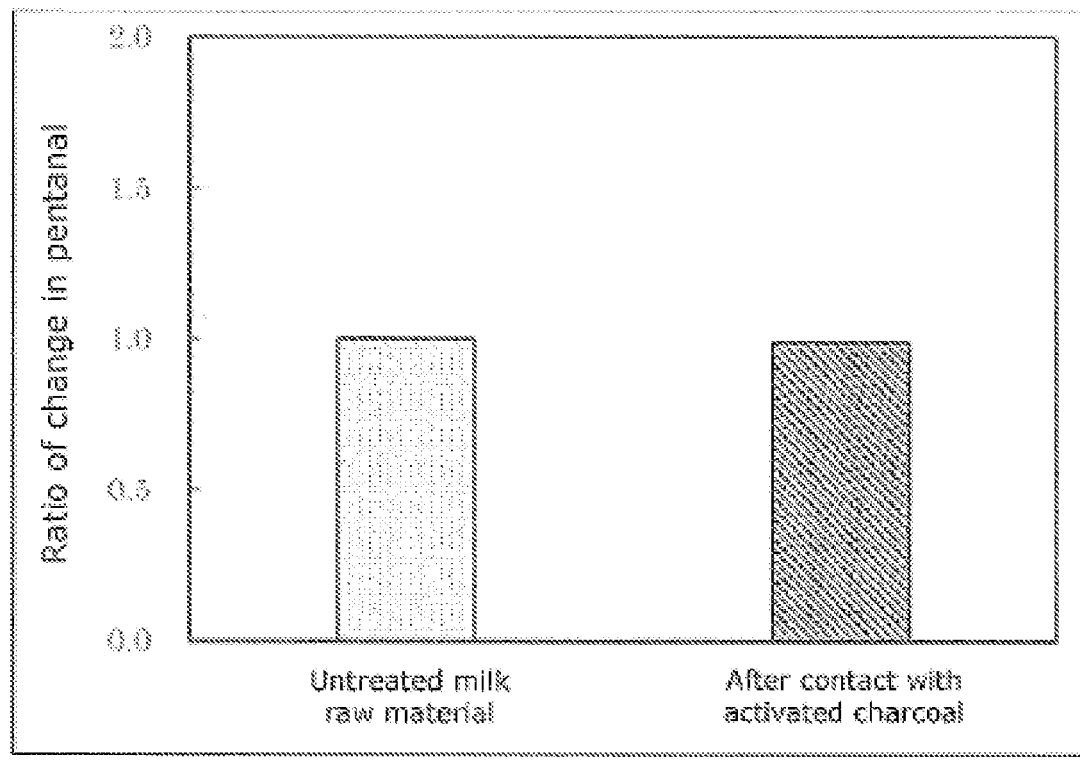
[Fig. 10]
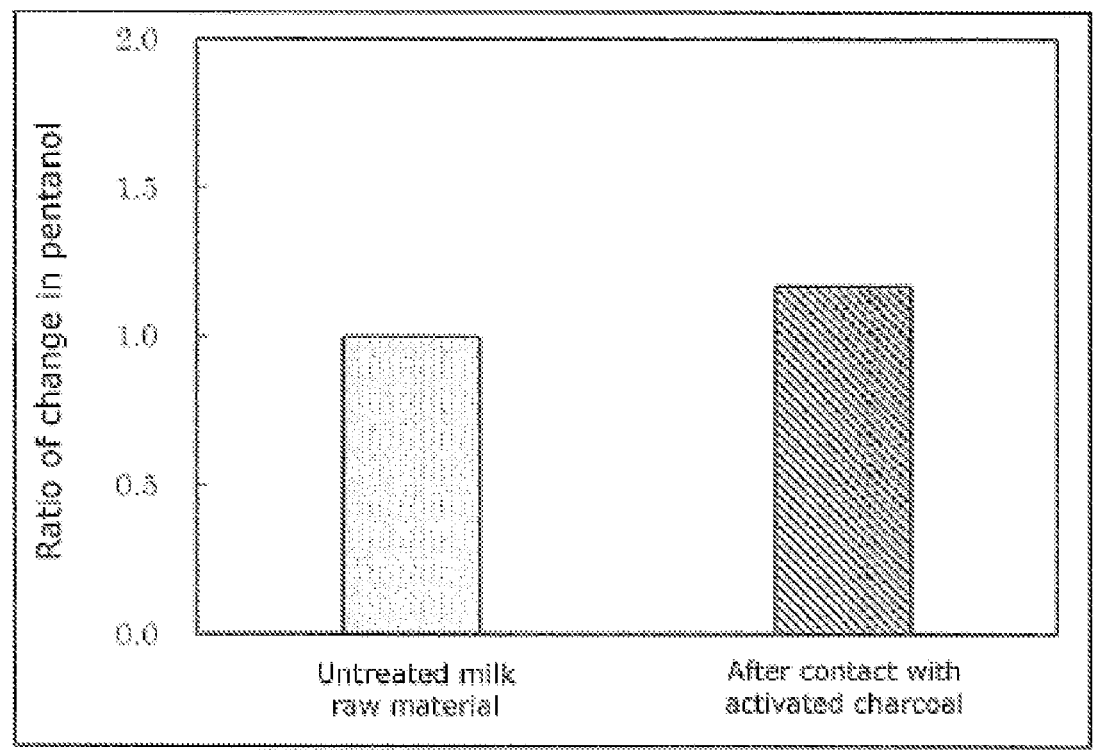

[Fig. 11]
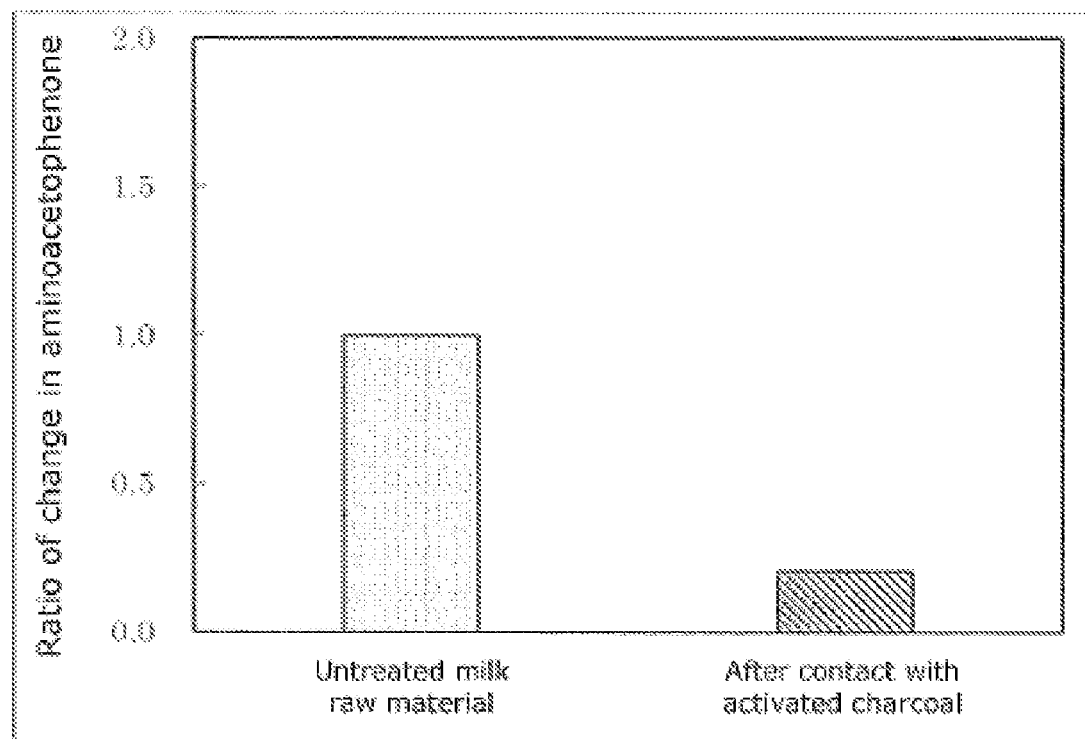
[Fig. 12]
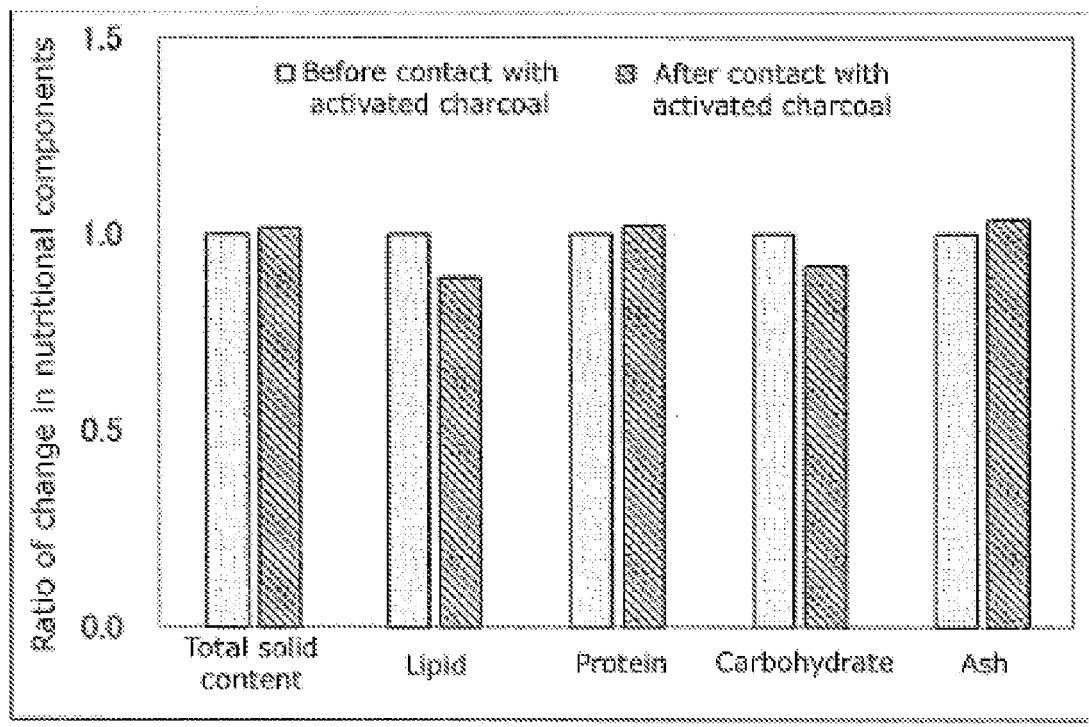

[Fig. 13]
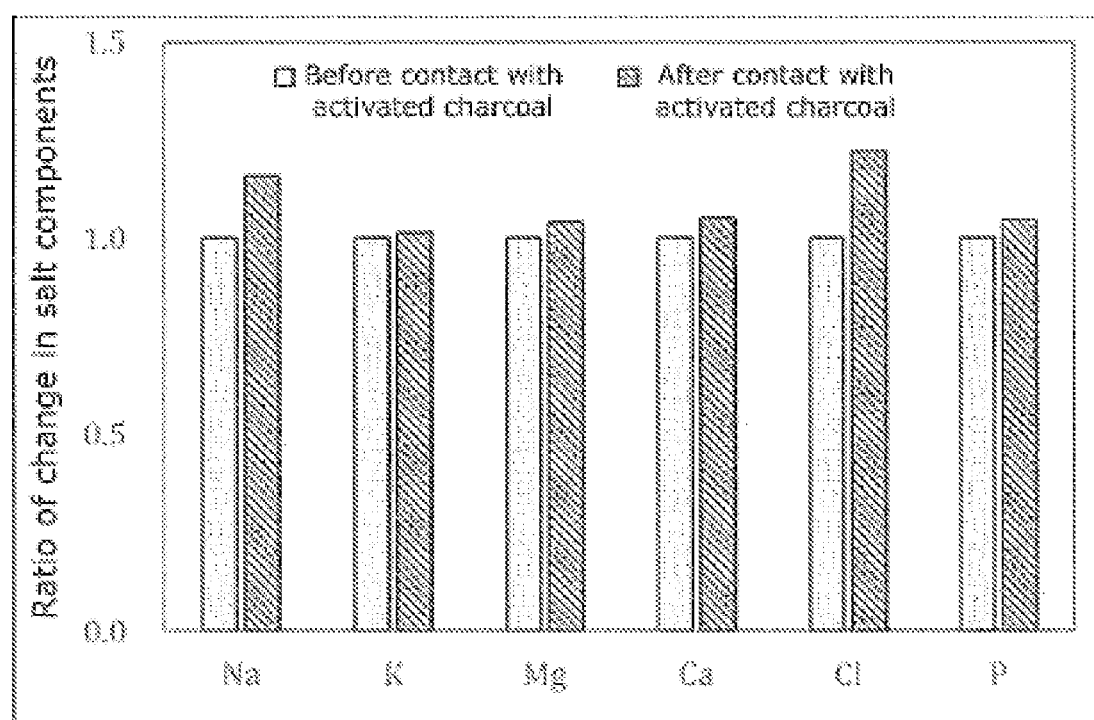

METHOD FOR PRODUCING HIGH-PROTEIN MILK RAW MATERIAL

CROSS-REFERENCES TO RELATED APPLICATIONS

The present application claims priority based on Japanese Patent Application No, 2018-202164, which is a Japanese application filed on Oct. 26, 2018, and the whole disclosures of this Japanese application are incorporated herein by reference as a part of this description.

BACKGROUND OF THE INVENTION

Field of the Invention

The present invention relates to a novel method for producing a milk raw material, and more particularly to a method for producing a milk raw material, which comprises a step of subjecting a high-protein milk fluid to treatment in contact with activated carbon (activated charcoal).

Background Art

In protein-containing foods, the flavor may be deteriorated by blending a high-protein milk raw material at a high concentration with raw milk. It is known that the odor peculiar to protein reduces by the addition of starch having a phosphate cross-linked structure to protein-containing foods (see Patent Document 1). However, the addition of a specific substance was required to reduce the odor peculiar to protein.

It is also known that activated carbon treatment can selectively and efficiently recover minerals from whey, produced as a by-product in the production of cheese and casein, to produce milk mineral concentrate with low sodium content and a salt-like flavor that can be effectively used as a so-called alternative salt (see Patent Document 2). However, it is not known that the activated carbon treatment can reduce a specific flavor in a high-protein milk raw material.

PRIOR ART DOCUMENTS

Patent Documents

[Patent Document 1] Japanese Patent Application Laid-Open Publication No. 2017-55710
[Patent Document 2] Japanese Patent Application Laid-Open Publication No, H02-107156

SUMMARY OF THE INVENTION

The inventors of the present invention have found that when a high-protein milk raw material is produced by subjecting a high-protein milk fluid to treatment in contact with activated carbon, the refreshing feeling is improved, the protein odor is reduced and the reductive odor is reduced in this milk raw material.

According to the present invention, it is possible to provide a good-flavored high-protein milk raw material having an improved refreshing feeling. Further, according to the present invention, it is also possible to provide a good-flavored high-protein milk raw material having a reduced protein odor. Further, according to the present invention, it is also possible to provide a good-flavored high-protein milk raw material having a reduced reductive odor.

According to the present invention, the following inventions are provided.

[1] A method for producing a liquid high-protein milk raw material, comprising:
  a step of preparing a high-protein milk fluid having a protein content of 60% by mass or more in the total solid content from a milk raw material, and
  a step of subjecting the milk fluid to treatment in contact with activated carbon (adsorption).
[2] The method for producing a milk raw material according to [1], wherein the milk raw material used for preparing the high-protein milk fluid has a protein content of 60% by mass or more in the total solid content.
[3] The method for producing a milk raw material according to [1] or [2], wherein the amount of the activated carbon used for subjecting the high-protein milk fluid to treatment in contact with activated carbon is 1% by mass or more with respect to the content of protein in the milk fluid.
[4] The method for producing a milk raw material according to any one of [1] to [3], wherein a concentration of the total solid content in the high-protein milk fluid is 2 to 20% by mass.
[5] The method for producing a milk raw material according to any one of [1] to [4], wherein a concentration of protein in the high-protein milk fluid is 1.5 to 18% by mass.
[6] The method for producing a milk raw material according to any one of [1] to [5], wherein the liquid high-protein milk raw material is a liquid milk protein concentrate (MPC) or a liquid whey protein concentrate (WPC).
[7] A method for producing a solid high-protein milk raw material obtained through a drying treatment, comprising: a step of further subjecting the liquid high-protein milk raw material produced by the production method according to any one of [1] to [6] to the drying treatment.
[8] The method for producing a milk raw material according to [7], wherein the solid high-protein milk raw material is a solid milk protein concentrate (MPC) or a solid whey protein concentrate (WPC).
[9] The method for producing a milk raw material according to any one of [1] to [8], wherein, when a content of dimethyl disulfide is measured after adjusting a refractive sugar content (Brix) of a milk raw material produced by the production method according to any one of [1] to [8] and a refractive sugar content (Brix) of the high-protein milk fluid to the same (equivalent), a content of dimethyl disulfide in the milk raw material produced by the production method according to any one of [1] to [8] is changed by 20% or more with respect to a content of dimethyl disulfide in the high-protein milk fluid.
[10] The method for producing a milk raw material according to any one of [1] to [9], wherein the milk raw material produced by the production method according to any one of [1] to [9] has an improved refreshing feeling.
[11] The method for producing a milk raw material according to any one of [1] to [10], wherein the milk raw material produced by the production method according to any one of [1] to [10] has a reduced protein odor.
[12] A method for improving a refreshing feeling of a milk raw material, comprising: preparing a high-protein milk fluid having a protein content of 60% by mass or more in the total solid content from the milk raw material, and subjecting the milk fluid to treatment in contact with activated carbon to obtain a liquid high-protein milk raw material.

[13] A method for improving a refreshing feeling of a milk raw material, comprising: preparing a high-protein milk fluid having a protein content of 60% by mass or more in the total solid content from the milk raw material, and subjecting the milk fluid to treatment in contact with activated carbon and then to drying treatment to obtain a solid high-protein milk raw material.

[14] A method for reducing a protein odor of a milk raw material, comprising: preparing a high-protein milk fluid having a protein content of 60% by mass or more in the total solid content from the milk raw material, and subjecting the milk fluid to treatment in contact with activated carbon to obtain a liquid high-protein milk raw material.

[15] A method for reducing a protein odor of a milk raw material, comprising: preparing a high-protein milk fluid having a protein content of 60% by mass or more in the total solid content from the milk raw material, and subjecting the milk fluid to treatment in contact with activated carbon and then to drying treatment to obtain a solid high-protein milk raw material.

[16] A method for producing a food or drink, comprising a step of including the milk raw material produced by the production method according to any one of [1] to [11] in the food or drink.

[17] The method for producing a food or drink according to [16], wherein the food or drink is sterilized.

[18] The method for producing a food or drink according to [16] or [17], wherein the food or drink is packed in a container.

[19] A food or drink containing the milk raw material produced by the production method according to any one of [1] to [11].

[20] The food or drink according to [19], wherein the food or drink is sterilized.

[21] The food or drink according to [19] or [20], wherein the food or drink is packed in a container.

The high-protein milk raw material produced by the production method of the present invention has an improved refreshing feeling, a reduced protein odor, and/or a reduced reductive odor. Accordingly, in the protein-containing food or drink, it is advantageous form the viewpoint of keeping a good flavor (the flavor does not deteriorate) even when blending the high-protein milk raw material at a high concentration with the raw milk.

BRIEF DESCRIPTION OF DRAWINGS

FIG. 1 shows the change of ratio in dimethyl disulfide of [liquid MPC (after the contact treatment with activated carbon) after treatment in contact with activated carbon] and [solid (powdery) MPC (after spray drying treatment) after treatment in contact with activated carbon and then drying treatment] with respect to [untreated MPC (milk protein concentrate: milk raw material having a protein content of about 80% by mass in the total solid content) (untreated milk raw material)].

FIG. 2 shows the change of ratio in nonanal of [liquid MPC (after the contact treatment with activated carbon) after treatment in contact with activated carbon] and [solid (powdery) MPC (after spray drying treatment) after treatment in contact with activated carbon and then drying treatment] with respect to [untreated MPC (untreated milk raw material)].

FIG. 3 shows the change of ratio in pentanal of [liquid MPC (after the contact treatment with activated carbon) after treatment in contact with activated carbon] and [solid (powdery) MPC (after spray drying treatment) after treatment in contact with activated carbon and then drying treatment] with respect to [untreated MPC (untreated milk raw material)].

FIG. 4 shows the change of ratio in pentanol of [liquid MPC (after the contact treatment with activated carbon) after treatment in contact with activated carbon] and [solid (powdery) MPC (after spray drying treatment) after treatment in contact with activated carbon and then drying treatment] with respect to [untreated MPC (untreated milk raw material)].

FIG. 5 shows the ratio of change in nutritional components (total solid content, lipid, protein, carbohydrate (sugar), ash), in the reductive liquid (5% by weight) of MPC powder (activated carbon) (powdery high-protein milk raw material), of after treatment with activated carbon with respect to before the treatment with activated carbon.

FIG. 6 shows the ratio of change in salt components (Na, K, Mg, Ca, Cl and P), in the reductive liquid (5% by weight) of MPC powder (activated carbon) (powdery high-protein milk raw material), of after treatment with activated carbon with respect to before the treatment with activated carbon.

FIG. 7 shows the ratio of change in dimethyl disulfide, in the reductive liquid (5% by weight) of MPC powder (activated carbon) (MPC6631) (powdery high-protein milk raw material), of after treatment with activated carbon with respect to before the treatment with activated carbon.

FIG. 8 shows the ratio of change in nonanal, in the reductive liquid (5% by weight) of MPC powder (activated carbon) (MPC6631) (powdery high-protein milk raw material), of after treatment with activated carbon with respect to before the treatment with activated carbon.

FIG. 9 shows the ratio of change in pentanal, in the reductive liquid (5% by weight) of MPC powder (activated carbon) (MPC6631) (powdery high-protein milk raw material), of after treatment with activated carbon with respect to before the treatment with activated carbon.

FIG. 10 shows the ratio of change in pentanal, in the reductive liquid (5% by weight) of MPC powder (activated carbon) (MPC6631) (powdery high-protein milk raw material), of after treatment with activated carbon with respect to before the treatment with activated carbon.

FIG. 11 shows the ratio of change in aminoacetophenone, in the reductive liquid (5% by weight) of MPC powder (activated carbon) (MPC6631) (powdery high-protein milk raw material), of after treatment with activated carbon with respect to before the treatment with activated carbon.

FIG. 12 shows the ratio of change in nutritional components (total solid content, lipid, protein, carbohydrate (sugar), ash), in the reductive liquid (5% by weight) of MPC powder (activated carbon) (MPC6631) (powdery high-protein milk raw material), of after treatment with activated carbon with respect to before the treatment with activated carbon.

FIG. 13 shows the ratio of change in salt components (Na, K, Mg, Ca, Cl and P), in the reductive liquid (5% by weight) of MPC powder (activated carbon) (MPC6631) (powdery high-protein milk raw material), of after treatment with activated carbon with respect to before the treatment with activated carbon.

DETAILED DESCRIPTION OF THE INVENTION

[Method for Producing a High-Protein Milk Raw Material]

The present invention is a method for producing a liquid high-protein milk raw material obtained through the contact treatment with activated carbon, including: a step of preparing a high-protein milk fluid (preferably, a high-protein milk fluid having a protein content of 60% by mass or more in the total solid content) from a milk raw material (preferably, a solid high-protein milk raw material having a protein content of 60% by mass or more in the total solid content), and a step of subjecting the milk fluid to treatment in contact with activated carbon (adsorption). At the same time, the present invention is also a method for producing a liquid high-protein milk raw material having an improved refreshing feeling and/or a good flavor. The present invention is also a method for producing a liquid high-protein milk raw material having a reduced protein odor and/or a good flavor. The present invention is also a method for producing a liquid high-protein milk raw material having a reduced reductive odor and/or a good flavor.

The "milk raw material" used as a starting material in the production method of the present invention is a fluid such as a liquid or gel containing a milk constituent, or a solid (powder, granule, tablet, etc.) dried product containing a milk constituent. Here, in the present invention, the "liquid high-protein milk raw material" is a fluid such as a liquid or gel containing a high concentration of protein, and preferably a liquid fluid containing a high concentration of protein. In the present invention, the "liquid high-protein milk raw material" has, but not particularly limited, preferably a protein content of 60% by mass or more in the total solid content, that is, 60% by mass or more to 100% by mass or less, more preferably a protein content of 65% by mass or more to 100% by mass or less in the total solid content, and further preferably a protein content of 70% by mass or more to 100% by mass or less in the total solid content, further more preferably a protein content of 75% by mass or more to 100% by mass or less in the total solid content, and particularly preferably a protein content of 80% by mass or more to 100% by mass or less in the total solid content. At this time, in the present invention, examples of the "liquid high-protein milk raw material" include a reductive liquid of milk protein concentrate (MPC: protein content of about 80% by mass in the total solid content), a reductive liquid of whey protein concentrate (WPC: protein content is about 80% by mass in the total solid content), reductive liquid of whey protein isolate (WPI: protein content is about 90% by mass in the total solid content), and a reductive liquid of caseinate (sodium caseinate, calcium caseinate, etc.: protein content is about 95% by mass in the total solid content). Among these, liquid milk protein concentrate (MPC) or liquid whey protein concentrate (WPC) is preferred.

In the present invention, a "solid high-protein milk raw material" is a dried product, such as a powder, granule, or tablet, containing a high concentration of protein, preferably a powdery or granule dried product containing a high concentration of protein, and more preferably a powdery dried product containing a high concentration of protein. In the present invention, the "solid high-protein milk raw material" has, but not particularly limited, preferably a protein content of 60% by mass or more in the total solid content, that is, 60% by mass or more to 100% by mass or less, more preferably a protein content of 65% by mass or more to 100% by mass or less in the total solid content, and further preferably a protein content of 70% by mass or more to 100% by mass or less in the total solid content, further more preferably a protein content of 75% by mass or more to 100% by mass or less in the total solid content, and particularly preferably a protein content of 80% by mass or more to 100% by mass or less in the total solid content. At this time, in the present invention, examples of the "solid high-protein milk raw material" include a powder of milk protein concentrate (MPC: protein content of about 80% by mass in the total solid content), a powder of whey protein concentrate (WPC: protein content is about 80% by mass in the total solid content), a powder of whey protein isolate (WPI: protein content is about 90% by mass in the total solid content), and a powder of caseinate (sodium caseinate, calcium caseinate, etc.: protein content is about 95% by mass in the total solid content). Among these, solid milk protein concentrate (MPC) or solid whey protein concentrate (WPC) is preferred.

The milk raw material used as a starting material in the production method of the present invention may be either the above-mentioned "liquid high-protein milk raw material" or the above-mentioned "solid high-protein milk raw material".

In the present invention, the "liquid milk protein concentrate (MPC)" is a milk protein concentrate prepared by concentrating, while keeping the liquid state, the "liquid high-protein milk raw material" which is obtained by using a reductive liquid of a milk protein concentrate or a liquid milk protein concentrate as a milk raw material of starting material, and is preferably liquid containing 60 to 100% by weight of milk protein in the total solid content. In addition, the above-mentioned "prepared by concentrating, while keeping the liquid state" preferably includes concentrating milk protein by ultrafiltration treatment while removing ash and lactose from a liquid high-protein milk raw material.

In the present invention, the "liquid whey protein concentrate (WPC)" is a whey protein concentrate prepared by concentrating, while keeping the liquid state, the "liquid high-protein milk raw material" which is obtained by using a reductive liquid of a whey protein concentrate or a liquid whey protein concentrate as a milk raw material of starting material. The "liquid whey protein concentrate (WPC)" is preferably liquid containing 60 to 100% by weight of whey protein in the total solid content. In addition, the above-mentioned "prepared by concentrating, while keeping the liquid state" preferably includes concentrating whey protein by ultrafiltration treatment while removing ash and lactose from a liquid high-protein milk raw material.

"Solid milk protein concentrate (MPC)" or "solid whey protein concentrate (WPC)" can be obtained through a step of subjecting the above-mentioned "liquid milk protein concentrate (MPC)" or "liquid whey protein concentrate (WPC)" respectively to drying treatment.

In the present invention, the "milk fluid" is a fluid such as a liquid or gel containing a milk constituent, and preferably a liquid fluid. In the present invention, the "high-protein milk fluid" is a fluid such as a liquid or gel containing a high concentration of protein, preferably a liquid fluid containing a high concentration of protein. The "high-protein milk fluid" is preferably a protein content of 60% by mass or more in the total solid content, that is, 60% by mass or more to 100% by mass or less, more preferably a protein content of 65% by mass or more to 100% by mass or less in the total solid content, and further preferably a protein content of 70% by mass or more to 100% by mass or less in the total solid content, further more preferably a protein content of 75% by mass or more to 100% by mass or less in the total solid content, and particularly preferably a protein content of 80% by mass or more to 100% by mass or less in the total solid content. At this time, in the present invention, examples of the "high-protein milk fluid" include a reductive liquid of milk protein concentrate (MPC: protein content of about 80% by mass in the total solid content), a reductive liquid of whey protein concentrate (WPC: protein content is about 80% by mass in the total solid content), a reductive liquid of whey protein isolate (WPI: protein content is about 90% by mass in the total solid content), a reductive liquid of caseinate (sodium caseinate, calcium caseinate, etc.: protein content is about 95% by mass in the total solid content), a liquid milk protein concentrate, a liquid whey protein concentrate, and a liquid whey protein isolate.

A preferred embodiment of the present invention is the method for producing a high-protein milk raw material, in which the amount of the activated carbon, used when subjecting the milk fluid to treatment in contact with activated carbon, is 1% by mass or more and preferably 3% by mass or more based on the protein content in the milk fluid (relative to the protein content in the milk fluid).

In the present invention, "subjecting the milk fluid to treatment in contact with activated carbon" means the adding the activated carbon in a batch manner to a tank or the like storing the milk fluid (stirring/mixing the milk fluid and the activated carbon as necessary), the supplying the milk fluid in a batch manner to a tank or the like charged with activated carbon (stirring/mixing the milk fluid and the activated carbon as necessary), or the supplying the milk fluid continuously to a column or the like filled with activated carbon to subject the milk fluid (supply liquid) in contact with the activated carbon, and then recovering the supply liquid (liquid milk raw material). At this time, since the treatment of the milk fluid in contact with activated carbon causes little change in a refractive sugar content between the milk fluid and the liquid milk raw material, the main nutritional components such as protein and sugar are conceivably not adsorbed on the activated carbon. And, in the present invention, the temperature for subjecting the milk fluid to treatment in contact with activated carbon is actually 40 to 70° C., preferably 45 to 65° C., more preferably 50 to 60° C., and further preferably 55 to 60° C.

In the present invention, the type of activated carbon is not particularly limited, and example of the type of activated carbon includes granular Shirasagi WH2C8/32 (manufactured by Osaka Gas Chemical Co., Ltd.). In addition, in the present invention, the shape of the activated carbon is not particularly limited, and examples of the shape of the activated carbon include granular, powdery, and fibrous shapes.

In the present invention, the amount of activated carbon used for subjecting a high-protein milk fluid to treatment in contact with activated carbon is, but not particularly limited, for example, 1% by mass or more, preferably 3% by mass or more, more preferably 3% by mass or more to 30% by mass or less, further preferably 3% by mass or more to 25% by mass or less, and further preferably 5% by mass or more to 20% by mass or less, further preferably 5% by mass or more to 15% by mass or less, and further preferably 5% by mass or more to 10% by mass or less, with respect to the content of protein in the high-protein milk fluid. Here, it is possible to appropriately remove the unnecessary flavors and the like while appropriately retaining the flavors and the like required as a milk raw material by setting the amount of activated carbon, used for subjecting a high-protein milk fluid to treatment in contact with activated carbon, to the above numerical values. Accordingly, the flavors can be adjusted in a high-protein milk raw material.

A preferred embodiment of the present invention is the method for producing a high-protein milk raw material, in which the concentration of total solid content in the high-protein milk fluid is 2 to 20% by mass during the preparation of a high-protein milk fluid from a milk raw material (preferably a solid high-protein milk raw material), preferably 2 to 15% by mass. Here, in the present invention, the "preparation of a high-protein milk fluid from a milk raw material (preferably a solid high-protein milk raw material)" means, for example, to prepare aqueous solutions, emulsions, suspensions, or the like of a high-protein milk raw material by dissolving (reducing) a solid high-protein milk raw material in cold water or warm water (warm water or hot water).

In the present invention, the concentration of the total solid content in the high-protein milk fluid is, but not particularly limited, preferably 1.5 to 18% by mass, more preferably 2 to 15% by mass (or 1.5 to 13% by mass), further preferably 3 to 13% by mass, further preferably 4 to 11% by mass, further preferably 5 to 11% by mass, and further preferably 5 to 10% by mass. Here, the setting of the concentration of the total solid content of the high-protein milk fluid to the above numerical values enables, for example, the solid high-protein milk raw material to dissolve (reduce) easily in water or hot water. Accordingly, it becomes easy to prepare aqueous solutions, emulsions, suspensions, or the like of a high-protein milk raw material.

A preferred embodiment of the present invention is the method for producing the high-protein milk raw material, in which the concentration of protein in the high-protein milk fluid is 1.5 to 13% by mass during the preparation of a high-protein milk fluid from a milk raw material (preferably a solid high-protein milk raw material).

In the present invention, the concentration of protein in the high-protein milk fluid is, but not particularly limited, preferably 1.5 to 13% by mass, more preferably 2 to 11% by mass, further preferably 2.5 to 9% by mass, further preferably 3.5 to 9% by mass, and further preferably 4 to 9% by mass. Here, the setting of the concentration of protein of the high-protein milk fluid to the above numerical values enables, for example, the solid high-protein milk raw material to dissolve (reduce) easily in water or hot water. Accordingly, it becomes easy to prepare aqueous solutions, emulsions, suspensions, or the like of a high-protein milk raw material.

A preferred embodiment of the present invention is the method for producing a solid high-protein milk raw material obtained through the drying treatment, in which a high-protein milk fluid (preferably a high-protein milk fluid having a protein content of 60% by mass or more in the total solid content) is prepared from a solid high-protein milk raw material having a protein content of 60% by mass or more in the total solid content, and the high-protein milk fluid is subjected to treatment in contact with activated carbon and then to drying treatment (the liquid high-protein milk raw material obtained through the contact treatment with activated carbon is subjected to drying treatment). At the same time, the present invention is also a method for producing a solid high-protein milk raw material having an improved refreshing feeling and/or a good flavor. The present invention is also a method for producing a solid high-protein milk raw material having a reduced protein odor and/or a good flavor. The present invention is also a method for producing a solid high-protein milk raw material having a reduced reductive odor and/or a good flavor. Here, in the present invention, various operating conditions and the like in the method for producing a solid high-protein milk raw material obtained through the drying treatment after the contact treatment with activated carbon may be the same as in the method for producing a liquid high-protein milk raw material obtained through the contact treatment with activated carbon.

In the present invention, the temperature of the blow air, for drying the liquid high-protein milk raw material obtained through the contact treatment with activated carbon, is preferably 150 to 250° C., more preferably 160 to 230° C., further preferably 170 to 210° C., and further preferably 180 to 200° C. In the present invention, the temperature of the exhaust air, for drying the liquid high-protein milk raw material obtained through the contact treatment with activated carbon, is preferably 60 to 100° C., more preferably 65 to 95° C., further preferably 70 to 90° C., and further preferably 75 to 85° C.

A preferred embodiment of the present invention is the method for producing a high-protein milk raw material, in which, when the content of dimethyl disulfide (Dimethyl disulfide e DMDS) is measured after adjusting the refractive sugar content (Brix) of the milk raw material produced by the production method of the present invention and the refractive sugar content (Brix) of a high-protein milk fluid to the same (equivalent), the content of dimethyl disulfide in the milk raw material produced by the production method of the present invention is changed by 20% or more compared (contrasted) with the content of dimethyl disulfide in the milk fluid. That is, in a preferred embodiment of the present invention, the high-protein milk raw material produced by the production method of the present invention has a change ratio in dimethyl disulfide content of 20% or more, compared with the high-protein milk fluid after adjusting the refractive sugar content to the same.

In a preferred embodiment of the present invention, the liquid high-protein milk raw material obtained through the contact treatment with activated carbon has a change ratio in dimethyl disulfide content of 20% or more, preferably 20 to 90%, more preferably 40 to 85%, and further preferably 60 to 85%, compared with the high-protein milk fluid after adjusting the refractive sugar content to the same. Further, in a preferred embodiment of the present invention, the solid high-protein milk raw material obtained through the drying treatment after the contact treatment with activated carbon has a change ratio in dimethyl disulfide content of 20% or more, preferably 20 to 90%, more preferably 40 to 85%, and further preferably 60 to 85%, compared with the high-protein milk fluid after adjusting the refractive sugar content to the same.

A preferred embodiment of the present invention is the method for producing a high-protein milk raw material, in which, when the content of nonanal (Nonanal) is measured after adjusting the refractive sugar content of the milk raw material produced by the production method of the present invention and the refractive sugar content of a high-protein milk fluid to the same, the content of nonanal in the milk raw material produced by the production method of the present invention is changed by 5% or more compared with the content of nonanal in the milk fluid. That is, in a preferred embodiment of the present invention, the high-protein milk raw material produced by the production method of the present invention has a change ratio in nonanal content of 5% or more, compared with the high-protein milk fluid after adjusting the refractive sugar content to the same.

In a preferred embodiment of the present invention, the liquid high-protein milk raw material obtained through the contact treatment with activated carbon has a change ratio in nonanal content of 5% or more, preferably 5 to 60%, more preferably 10 to 50%, and further preferably 20 to 50%, compared with the high-protein milk fluid after adjusting the refractive sugar content to the same. Further, in a preferred embodiment of the present invention, the solid high-protein milk raw material obtained through the drying treatment after the contact treatment with activated carbon has a change ratio in nonanal content of 5% or more, preferably 5 to 60%, more preferably 10 to 50%, and further preferably 20 to 50%, compared with the high-protein milk fluid after adjusting the refractive sugar content to the same.

A preferred embodiment of the present invention is the method for producing a high-protein milk raw material, in which, when the content of pentanal (pentanal) is measured after adjusting the refractive sugar content of the milk raw material produced by the production method of the present invention and the refractive sugar content of a high-protein milk fluid to the same, the content of pentanal in the milk raw material produced by the production method of the present invention is changed by 40% or less compared with the content of pentanal in the milk fluid. That is, in a preferred embodiment of the present invention, the high-protein milk raw material produced by the production method of the present invention has a change ratio in pentanal content of 40% or less, compared with the high-protein milk fluid after adjusting the refractive sugar content to the same.

In a preferred embodiment of the present invention, the liquid high-protein milk raw material obtained through the contact treatment with activated carbon has a change ratio in pentanal content of 40% or less, preferably 0 to 40%, more preferably 0 to 30%, and further preferably 0 to 20%, compared with the high-protein milk fluid after adjusting the refractive sugar content to the same. Further, in a preferred embodiment of the present invention, the solid high-protein milk raw material obtained through the drying treatment after the contact treatment with activated carbon has a change ratio in pentanal content of 40% or less, preferably 0 to 40%, more preferably 0 to 30%, and further preferably 0 to 20%, compared with the high-protein milk fluid after adjusting the refractive sugar content to the same.

A preferred embodiment of the present invention is the method for producing a high-protein milk raw material, in which, when the content of pentanol (Pentanol) is measured after adjusting the refractive sugar content of the milk raw material produced by the production method of the present invention and the refractive sugar content of a high-protein milk fluid to the same, the content of pentanol in the milk raw material produced by the production method of the present invention is changed by 5% or more compared with the content of pentanol in the milk fluid. That is, in a preferred embodiment of the present invention, the high-protein milk raw material produced by the production method of the present invention has a change ratio in pentanol content of 5% or more, compared with the high-protein milk fluid after adjusting the refractive sugar content to the same.

In a preferred embodiment of the present invention, the liquid high-protein milk raw material obtained through the contact treatment with activated carbon has a change ratio in pentanol content of 5% or more, preferably 5 to 60%, more preferably 10 to 50%, and further preferably 20 to 50%, compared with the high-protein milk fluid after adjusting the refractive sugar content to the same. Further, in a preferred embodiment of the present invention, the solid high-protein milk raw material obtained through the drying treatment after the contact treatment with activated carbon has a change ratio in pentanol content of 5% or more, preferably 5 to 60%, more preferably 10 to 50%, and further preferably 20 to 50%, compared with the high-protein milk fluid after adjusting the refractive sugar content to the same.

In the present invention, the ratio of change in the content of aroma components (flavor substances), such as dimethyl disulfide, nonanal, pentanol, pentanol, and aminoacetophenone, can be evaluated as a relative value for each sample by, for example, the following method.

(1) After adjusting the refractive sugar content of each sample to 5%, these samples (volume: 8 mL) and sodium chloride (weight: 3 g) are charged in a vial (volume: 20 mL). Methyl isobutyl ketone (MIBK) is added in the vial as an internal standard substance, and then the vial is sealed.

(2) The vial is warmed at 60° C. for 40 minutes.

(3) The "aroma (smell) component" in the headspace of the vial is extracted by solid phase microfiber (50/30 μm DVB/CAR/PDMS).

(4) The solid phase microfiber is analyzed by a gas chromatograph mass spectrometer (GC/MS, column: DB-WAX UI).

(5) The area value of the aroma component is specified by the solid phase microextraction method (SPME method), and based on the ratio (relative value) of change of the aroma components after the contact treatment with activated carbon compared to that before the contact treatment with activated carbon, the behavior of change in the aroma components associated with the contact treatment with activated carbon is evaluated. Here, the solid phase microextraction method is a technique capable of rapidly analyzing volatile aroma components with high sensitivity.

In a preferred embodiment of the present invention, the ratio of change in the concentration of nutritional components (total solid content, lipids, proteins, carbohydrate (sugar), ash) is 40% or less and/or the ratio of change in the concentration of salt components (Na, K, Mg, Ca, Cl, P) is 55% or less of the liquid or solid high-protein milk raw material after the treatment with activated carbon, compared with the high-protein milk fluid before the treatment with activated carbon. The liquid or solid high-protein milk raw material produced by the production method of the present invention can provide a high-protein milk raw material having an improved refreshing feeling and a good flavor almost without change in nutritional components and salt components, which is further advantageous.

In a more preferred embodiment of the present invention, the ratio of change in the total solid content concentration of the liquid or solid high-protein milk raw material after the treatment with activated carbon is 20% or less, preferably 15% or less, more preferably 10% or less, and further preferably 5% or less, compared with the high-protein milk fluid before the treatment with activated carbon. The total solid content concentration of the milk raw material can be determined, for example, based on the method described in the following Examples.

In a more preferred embodiment of the present invention, the ratio of change in lipid concentration of the liquid or solid high-protein milk raw material after the treatment with activated carbon is 30% or less, preferably 25% or less, more preferably 20% or less, and further preferably 15% or less, compared with the high-protein milk fluid before the treatment with activated carbon. The lipid concentration of milk raw materials can be measured and determined by the Gerber method (see "2 Lipids (3) Gerber Method" in "Analysis method of attached nutritional components, etc." corresponding to the details of the method listed in the third column of Attached Table 9 of Food Labeling Standards (2015 Cabinet Office Ordinance No. 10)).

In a more preferred embodiment of the present invention, the ratio of change in protein concentration of the liquid or solid high-protein milk raw material after the treatment with activated carbon is 20% or less, preferably 15% or less, more preferably 10% or less, and further preferably 5% or less, compared with the high-protein milk fluid before the treatment with activated carbon. The protein concentration of the milk raw material can be measured and determined by the Lowry method (see "Protein Quantification Method I" Chemistry and Biology, Vol. 4, No. 1, pp. 37-44, 1966).

In a more preferred embodiment of the present invention, the ratio of change in carbohydrate (sugar) concentration of the liquid or solid high-protein milk raw material after the treatment with activated carbon is 40% or less, preferably 35% or less, more preferably 30% or less, and further preferably 25% or less, compared with the high-protein milk fluid before the treatment with activated carbon. The carbohydrate (sugar) concentration of the milk raw material can be determined, for example, based on the method described in the following Examples.

In a more preferred embodiment of the present invention, the ratio of change in ash concentration of the liquid or solid high-protein milk raw material after the treatment with activated carbon is 20% or less, preferably 15% or less, more preferably 10% or less, and further preferably 5% or less, compared with the high-protein milk fluid before the treatment with activated carbon. The ash concentration of the milk raw material can be determined, for example, based on the method described in the following Examples.

In a more preferred embodiment of the present invention, the ratio of change in sodium (Na) concentration of the liquid or solid high-protein milk raw material after the treatment with activated carbon is 35% or less, preferably 30% or less, more preferably 25% or less, and further preferably 20% or less, compared with the high-protein milk fluid before the treatment with activated carbon.

In a more preferred embodiment of the present invention, the ratio of change in potassium (K) concentration of the liquid or solid high-protein milk raw material after the treatment with activated carbon is 20% or less, preferably 15% or less, more preferably 10% or less, and further preferably 5% or less, compared with the high-protein milk fluid before the treatment with activated carbon.

In a more preferred embodiment of the present invention, the ratio of change in magnesium (Mg) concentration of the liquid or solid high-protein milk raw material after the treatment with activated carbon is 25% or less, preferably 20% or less, more preferably 15% or less, and further preferably 10% or less, compared with the high-protein milk fluid before the treatment with activated carbon.

In a more preferred embodiment of the present invention, the ratio of change in calcium (Ca) concentration of the liquid or solid high-protein milk raw material after the treatment with activated carbon is 30% or less, preferably 25% or less, more preferably 20% or less, and further preferably 15% or less, compared with the high-protein milk fluid before the treatment with activated carbon.

In a more preferred embodiment of the present invention, the ratio of change in phosphorus (P) concentration of the liquid or solid high-protein milk raw material after the treatment with activated carbon is 20% or less, preferably 15% or less, more preferably 10% or less, and further preferably 5% or less, compared with the high-protein milk fluid before the treatment with activated carbon.

Here, the concentrations of sodium (Na), potassium (K), magnesium (Mg), calcium (Ca), and phosphorus (P) of the milk raw materials can be measured and determined by high frequency inductively coupled plasma (Inductively Coupled Plasma: ICP) emission spectroscopic analysis (see each of "10 Potassium (3) inductively coupled plasma emission analytical method", "11 calcium (3) inductively coupled plasma emission analytical method", "16 sodium (equivalent to salt) (3) inductively coupled plasma emission analytical method", and "21 phosphorus (3) inductively coupled plasma emission analytical method" in "Attached nutritional component analysis methods, etc." corresponding to the details of the methods listed in the third column of Attached Table 9 of Food Labeling Standards (2015 Cabinet Office Ordinance No. 10)).

In a more preferred embodiment of the present invention, the ratio of change in chlorine (Cl) concentration of the liquid high-protein milk raw material after the treatment with activated carbon is 55% or less, preferably 50% or less, and more preferably 40% or less, compared with the high-protein milk fluid before the treatment with activated carbon. The chlorine (Cl) concentration of the milk raw material can be measured and determined by the rotating electrode polarographic method.

[Food or Drink and its Production Method]

According to one embodiment of the present invention, there is provided a method for producing a food or drink, which includes a step of including a milk raw material produced by the production method of the present invention in the food or drink.

To the food or drink containing the milk raw material produced by the production method of the present invention, optional component other than the milk raw material produced by the production method of the present invention can be added as necessary. As such an optional components, but not particularly limited, usually components to be blended in a food or drink, such as aqueous raw materials, oil-based raw materials, carbohydrates, dietary fibers, polysaccharides, proteins, peptides, amino acids, lipids, organic acids, various physiologically active substances, vitamins, minerals, acidulants, flavors, sweeteners, emulsifiers, thickeners, gelling agents, functional materials, fats and oils, excipients, coloring agents, food preservatives, water (hot water, warm water, normal temperature water, cold water) and the like can be exemplified.

According to a preferred embodiment of the present invention, there is provided a method for producing a food or drink, which includes a step of mixing one or two or more selected from the following group of optional components with the milk raw material produced by the production method of the present invention and including the mixture in the food or drink: the group consisting of aqueous raw materials, oil-based raw materials, flavors, sweeteners, emulsifiers, thickeners, gelling agents, functional materials, fats and oils, excipients, and water. Here, examples of water include hot water, warm water, normal temperature water, and cold water. Here, the term "mixing" may mean either the milk raw material produced by the production method of the present invention and the above-mentioned optional components are mixed before being added to the food or drink and then the mixture is added to the food or drink, or the milk raw material produced by the production method of the present invention is added to a food or drink and then the above-mentioned optional components are added to the food or drink, and thereafter the milk raw material and the optional components are mixed in the food or drink.

Examples of the aqueous raw material that can be contained in the food or drink of the present invention include milk raw materials (milk, defatted milk, low-fat milk, ingredient-adjusted milk, etc.) other than the milk raw material of the present invention, milk beverages, fermented milk, soy milk, fruit juice, vegetable juice, fruit/vegetable paste, fruit/vegetable extract, alcoholic beverages, liquid sugar, and the like.

Examples of the oil-based raw material that can be contained in the food or drink of the present invention include butter, margarine, shortening, cream, chocolate, cacao mass, cocoa butter, almond paste, and the like.

According to a more preferable embodiment of the present invention, there is provided a method for producing a food or drink, which includes a step of including a milk raw material produced by the production method of the present invention in the food or drink, wherein the milk raw material is a liquid high-protein milk raw material obtained through the contact treatment with activated carbon.

According to a more preferable embodiment of the present invention, there is provided a method for producing a food or drink, which includes a step of including a milk raw material produced by the production method of the present invention in the food or drink, wherein the milk raw material is a solid (powdery) high-protein milk raw material obtained through the drying treatment after the contact treatment with activated carbon.

The food or drink capable of including the liquid or solid high-protein milk raw material produced by the production method of the present invention may be in any form, such as solution, suspension, emulsion, powders, pastes, semi-solid forming products, solid forming products, and the like, and is not particularly limited as long as they can be taken orally. Examples of the food or drink include instant foods such as instant noodles, retort foods, canned foods, microwave foods, instant soups/miso soups, freeze-dried foods; beverages such as soft drinks, fruit juice beverages, vegetable beverages, soy milk beverages, coffee beverages, tea beverages, powdered beverages, concentrated beverages, alcoholic drinks; wheat flour products such as bread, pasta, noodles, cake mix, bread flour; confectioneries such as candy, caramel, gummy candy, chewing gum, chocolate, cookies, biscuits, bars, cakes, pies, snacks, crackers, Japanese confectioneries, puddings, jellies, mousses, desserts, sherbets; seasonings such as sauces, tomatoes processed seasonings, flavor seasonings, cooking mixes, sauces for dipping, dressings, seasoning soy sauces, curry/stew ingredients; oils and fats such as processed fats, butter, margarine, mayonnaise; dairy products such as dairy beverages, fermented milk, lactic acid bacteria beverages, ice creams (ice cream, ice milk, lact ice), creams; processed agricultural products such as canned agricultural products, jam/marmalades, cereals; frozen foods, liquid foods and the like. In addition, examples of the food or drink also include health foods, functional foods (including, for example, special health foods, foods with nutritional function or foods with functional claims), nutritional supplements, foods for special dietary uses (for example, foods for patients, infant formula, powdered milk for pregnant women/lactating women or foods for people with swallowing difficulties) or liquid prepared milk for infants (also referred to as liquid milk for infants). Among these, beverages, confectioneries, dairy products, and liquid foods are preferable, fermented milk, dairy beverages, coffee beverages, tea beverages, soft drinks, powdered beverages, liquid foods, and ice creams (ice cream, ice milk, lact ice), sherbets, and pudding are more preferable, and coffee beverages are particularly preferable. The liquid or solid high-protein milk raw material produced by the production method of the present invention enables the foods or drinks to improve refreshing feeling and enhance the protein content while maintaining a preferable flavor without impairing the original flavor of the blended food or drink, which is advantageous.

According to a more preferable embodiment of the present invention, there is provided a method for producing a food or drink, which includes a step of including a milk raw material produced by the production method of the present invention in the food or drink, wherein the food or drink is dairy products, fermented milks, milk beverages, coffee beverages, tea beverages, soft drinks, liquid foods, sherbets, or ice creams. Here, examples of ice creams include ice cream, ice milk, and lact ice.

According to a preferred embodiment of the present invention, there is provided a method for producing a food or drink having an improved refreshing feeling, which includes a step of including the milk raw material produced by the production method of the present invention in the food or drink, Here, "improved refreshing feeling" means that in a food or drink containing protein, miscellaneous taste is reduced, heated odor is reduced, sulfurous odor is reduced, flour-like flavor is reduced, and the like.

According to another preferred embodiment of the present invention, there is provided a method for producing a food or drink having a reduced protein odor, which includes a step of including the milk raw material produced by the production method of the present invention in the food or drink. Here, "reduced protein odor" means that in a food or drink containing protein, miscellaneous taste derived from high-concentration proteins is reduced, flavor substances such as dimethyl disulfide are reduced, and the like.

According to a preferred embodiment of the present invention, there is provided a method for producing a food or drink having a reduced reductive odor, which includes a step of including the milk raw material produced by the production method of the present invention in the food or drink.

According to another embodiment of the present invention, there is provided a food or drink containing a milk raw material produced by the production method of the present invention. The food or drink containing the milk raw material produced by the production method of the present invention may be the same as the food or drink capable of containing the liquid or solid high-protein milk raw material produced by the above-mentioned production method of the present invention.

As described above, to the food or drink of the present invention, optional components other than the milk raw material produced by the production method of the present invention can be added. According to a preferred embodiment of the present invention, there is provided a food or drink, in addition to the milk raw material produced by the production method of the present invention, further comprising one or two or more selected from the group consisting of aqueous raw materials, oil-based raw materials, flavors, sweeteners, emulsifiers, thickeners, gelling agents, functional materials, fats and oils, excipients, and water (hot water, warm water, room temperature water, and cold water).

According to a preferred embodiment of the present invention, there is provided a food or drink containing the milk raw material produced by the production method of the present invention, wherein the milk raw material is a liquid high-protein obtained by the contact treatment with activated carbon.

According to a preferred embodiment of the present invention, there is provided a food or drink containing the milk raw material produced by the production method of the present invention, wherein the milk raw material is a solid (powdery) high-protein obtained through the drying treatment after the contact treatment with activated carbon.

According to a preferred embodiment of the present invention, there is provided a food or drink containing the milk raw material produced by the production method of the present invention, wherein the food or drink is dairy products, fermented milks, milk beverages, coffee beverages, tea beverages, soft drinks, liquid foods, sherbets, or ice creams (ice cream, ice milk, and lact ice).

According to a preferred embodiment of the present invention, there is provided a food or drink containing a milk raw material produced by the production method of the present invention and having an improved refreshing feeling.

According to the other preferred embodiment of the present invention, there is provided a food or drink containing a milk raw material produced by the production method of the present invention and having a reduced protein odor.

According to the other preferred embodiment of the present invention, there is provided a food or drink containing a milk raw material produced by the production method of the present invention and having a reduced reductive odor.

The food or drink of the present invention may be produced by any production method as long as it is produced so that the milk raw material produced by the production method of the present invention is contained, and for example, the food or drink can be produced by mixing the above-mentioned optional components with the milk raw material produced by the production method of the present invention, and then adding the mixture to the food or drink.

Further, when producing the food or drink of the present invention, sterilization (preferably heat sterilization) may be performed before, after, or while adding the milk raw material produced by the production method of the present invention to the food or drink. Heat sterilization can be performed by methods and equipment commonly used in the food field. There may be used methods, for example, such as Low Temperature Long Time sterilization method (LTLT), High Temperature Long Time sterilization method (HTLT), High Temperature Short Time sterilization method (HTST) and Ultra High Temperature sterilization method (UHT). The following equipment for heat sterilization includes indirect heating type sterilizers (plate type sterilizers and tube type sterilizers, etc.), direct heating type sterilizers (steam injection type sterilizers, steam infusion type sterilizers, etc.), electrically heating type sterilizers, retort sterilizers, tanks with a stirring/temperature control function and tanks with a stirring/temperature control/depressurization/homogenization function. Further, the above-mentioned optional component may be added at any time before or after sterilization, or during sterilization, and may be added after being packed in a container, which will be described later. The sterilized food or drink of the present invention maintains the effect of improved refreshing feeling and reduced protein odor in spite of containing the high-protein milk raw material even after sterilization treatment (for example, heat sterilization treatment). Since the sterilized food or drink of the present invention maintains the above-mentioned effect even after the retort sterilization treatment being the most severe conditions as heat sterilization treatment, the effect is maintained after the other sterilization treatment being the milder conditions.

Further, the food or drink of the present invention may be a packaged food or drink (preferably a sterilized packaged food or drink). For example, a packaged beverage can be obtained by filling a container with a liquid obtained by mixing a milk raw material produced by the production method of the present invention and optional components, and then sealing the container. For containers used for a packaged food or drink, any containers can be used without limitation as long as in the usual form, as a general food or drink, such as molded containers (so-called PET bottles) containing the main component of polyethylene terephthalate, metal cans, paper containers composited with metal foil or plastic film, and bottles. Further, when it is possible to heat sterilize the food or drink after being filled in a container such as a metal can, the heat sterilization treatment of the packaged food or drink is performed under the sterilization conditions set by the Food Sanitation Law. For those that cannot be retort sterilization such as a PET bottle and a paper container, the same sterilization conditions as the above can be used in advance, for example, High Temperature Short Time sterilization in a plate heat exchanger, followed by cooling to a certain temperature and then the resultant is filled in the container. Further, to the filled container, other components may be blended and filled under aseptic conditions. The packaged food or drink of the present invention, even after being packaged (preferably after being packaged and sterilized), maintains the effect of improving refreshing feeling and reducing protein odor in spite of containing a high-protein milk raw material. In addition, since the sterilized packaged food or drink of the present invention maintains the above-mentioned effect even after the retort sterilization treatment being the most severe conditions as heat sterilization treatment after being filled in the container, the effect is maintained after the other packaging and sterilization treatment being milder conditions.

According to a preferred embodiment of the present invention, there is provided a method for producing a sterilized (preferably heat-sterilized) food or drink, which includes a step of including a milk raw material produced by the production method of the present invention in the food or drink.

According to a preferred embodiment of the present invention, there is provided a sterilized (preferably heat-sterilized) food or drink containing a milk raw material produced by the production method of the present invention.

[Method for Improving the Refreshing Feeling of Milk Raw Material]

According to the other embodiment of the present invention, there is provided a method for improving a refreshing feeling of a milk raw material (before the contact treatment with activated carbon), including: preparing a high-protein milk fluid (preferably, a high-protein milk fluid having a protein content of 60% by mass or more in the total solid content) from a milk raw material (preferably, a solid high-protein milk raw material having a protein content of 60% by mass or more in the total solid content), and subjecting the milk fluid to treatment in contact with activated carbon to obtain a liquid high-protein milk raw material. By subjecting the milk raw material used as the starting material in the production method of the present invention to treatment in contact with activated carbon, the refreshing feeling of the milk raw material can be improved. Here, in the present invention, various operating conditions and the like of the method for improving the refreshing feeling of the milk raw material before the contact treatment with activated carbon may be the same as the method for producing a liquid high-protein milk raw material obtained through the contact treatment with activated carbon.

According to a preferred embodiment of the present invention, there is provided a method for improving the refreshing feeling of a milk raw material (before the contact treatment with activated carbon), including: subjecting a high-protein milk fluid having a protein content of 60% by mass or more in the total solid content prepared from a milk raw material to treatment in contact with activated carbon and then to drying treatment (by subjecting the above-mentioned liquid high-protein milk raw material to drying treatment) to obtain a solid high-protein milk raw material. Here, in the present invention various operating conditions and the like of the method for improving the refreshing feeling of the milk raw material before the contact treatment with activated carbon may be the same as the method for producing a solid high-protein milk raw material obtained through the drying treatment after the contact treatment with activated carbon.

In the present invention, "improved refreshing feeling" means that in a food or drink containing protein, miscellaneous taste is reduced, heated odor is reduced, sulfurous odor is reduced, flour-like flavor is reduced, and the like.

[Method for Reducing Protein Odor of Milk Raw Material]

According to the other embodiment of the present invention, there is provided a method for reducing a protein odor of a milk raw material (before the contact treatment with activated carbon), including: preparing a high-protein milk fluid (preferably, a high-protein milk fluid having a protein content of 60% by mass or more in the total solid content) from a milk raw material (preferably, a solid high-protein milk raw material having a protein content of 60% by mass or more in the total solid content), and subjecting the milk fluid to contact treatment with activated carbon to obtain a liquid high-protein milk raw material. By subjecting the milk raw material used as the starting material in the production method of the present invention to treatment in contact with activated carbon, the protein odor of the milk raw material can be reduced. Here, in the present invention, various operating conditions and the like of the method for reducing the protein odor of the milk raw material before the contact treatment with activated carbon may be the same as the method for producing a liquid high-protein milk raw material obtained through the contact treatment with activated carbon.

According to a preferred embodiment of the present invention, there is provided a method for reducing a protein odor of a milk raw material (before the contact treatment with activated carbon), including: subjecting a high-protein milk fluid having a protein content of 60% by mass or more in the total solid content prepared from a milk raw material to treatment in contact with activated carbon and then to drying treatment (by subjecting the above-mentioned liquid high-protein milk raw material to drying treatment) to obtain a solid high-protein milk raw material. Here, in the present invention, various operating conditions and the like of the method for reducing a protein odor of the milk raw material before the contact treatment with activated carbon may be the same as the method for producing a solid high-protein milk raw material obtained through the drying treatment after the contact treatment with activated carbon.

In the present invention, "reducing protein odor" means that in a food or drink containing protein, miscellaneous taste derived from high-concentration proteins is reduced, flavor substances such as dimethyl disulfide are reduced, and the like.

[Method for Reducing Reductive Odor of Milk Raw Material]

According to the other embodiment of the present invention, there is provided a method for reducing a reductive odor of a milk raw material (before the contact treatment with activated carbon), including: preparing a high-protein milk fluid (preferably, a high-protein milk fluid having a protein content of 60% by mass or more in the total solid content) from a milk raw material (preferably, a solid high-protein milk raw material having a protein content of 60% by mass or more in the total solid content), and subjecting the milk fluid to treatment in contact with activated carbon to obtain a liquid high-protein milk raw material. By subjecting the milk raw material used as the starting material in the production method of the present invention to treatment in contact with activated carbon, the reductive odor of the milk raw material can be reduced. Here, in the present invention, various operating conditions and the like of the method for reducing the reductive odor of the milk raw material before the contact treatment with activated carbon may be the same as the method for producing a liquid high-protein milk raw material obtained through the contact treatment with activated carbon.

According to a preferred embodiment of the present invention, there is provided a method for reducing a reductive odor of a milk raw material (before the contact treatment with activated carbon), including: subjecting a high-protein milk fluid having a protein content of 60% by mass or more in the total solid content prepared from a milk raw material to treatment in contact with activated carbon and then to drying treatment (by subjecting the above-mentioned liquid high-protein milk raw material to drying treatment) to obtain a solid high-protein milk raw material. Here, in the present invention, various operating conditions and the like of the method for reducing a reductive odor of the milk raw material before the contact treatment with activated carbon may be the same as the method for producing a solid high-protein milk raw material obtained through the drying treatment after the contact treatment with activated carbon.

EXAMPLES

Hereinafter, the present invention will be described in more detail with reference to Examples, but the technical scope of the present invention is not limited to the contents of these Examples. In addition, the following examples are a part of the embodiments specifically implemented by the present inventors, and though other embodiments included within the scope of the present invention other than the following examples are confirmed on the effects of the invention, they are not specifically shown here.

Test Example 1

Contact Treatment 1 with Activated Carbon (Adsorption) of Reductive Liquid (High-Protein Milk Fluid) of Milk Protein Concentrate (MPC)

This test was conducted as follows.
(1-1) Milk raw material (MPC) (MPC4882, Fonterra Limited) was dissolved in warm water (60° C.), and the MPC reductive liquid (milk fluid) (total solid content: 10% by mass, protein content: 8% by mass) was prepared at 2 kg.
(1-2) The MPC reductive liquid (60° C.) was divided into 3 aliquots each at 0.5 kg.
(1-3) After adding activated carbon (granular, Shirasagi WH2C8/32, Osaka Gas Chemical Co., Ltd.) at 0.4, 0.8, 1.2% by mass to each aliquot of the MPC reductive liquid (60° C.), and each of the mixtures was held stirred/mixed with a stirrer for about 20 minutes and under treatment in contact with activated carbon (adsorption) to prepare the reductive liquid of MPC (activated carbon) (activated carbon was added at a ratio corresponding to 5, 10 and 15% by mass based on the protein content).
(1-4) Each aliquot of the MPC reductive liquid (activated carbon) was filtered through a sieve (metal filter, opening: 80 mesh) to separate the MPC reductive liquid (activated carbon) and the activated carbon to prepare MPC reductive liquid (activated carbon, 5% by mass), MPC reductive liquid (activated carbon, 10% by mass), and MPC reductive liquid (activated carbon, 15% by mass).

Flavor of MPC reductive liquid (activated carbon) (Brix: 10%) (3 types: "activated carbon, 5% by mass", "activated carbon, 10% by mass", and "activated carbon, 15% by mass") obtained through the above steps (1-1) to (1-4) was examined by 10 members of a specialized panel.

From the results of the above-mentioned examination of flavor, 10 members (all) of the specialized panel evaluated that any of the above-mentioned MPC reductive liquid (activated carbon) (Brix: 10%) after the contact treatment with activated carbon had an improved refreshing feeling, a reduced protein odor and a reduced reductive odor, as compared with the untreated MPC reductive liquid (Brix: 10%): the MPC reductive liquid (activated carbon) (Brix: 10%) (3 types: 5% by mass, 10% by mass, and 15% by mass of the amount of activated carbon used during the contact treatment with activated carbon of the milk fluid, with respect to the protein content in the milk fluid (with respect to the content of protein contained in the milk fluid)) were obtained by the above-mentioned steps (1-1) to (1-4).

Test Example 2

Contact Treatment 2 with Activated Carbon (Adsorption) of Reductive Liquid (High-Protein Milk Fluid) of Milk Protein Concentrate (MPC)

This test was conducted as follows. In this test (Test Example 2), the scale is larger than that in Test Example 1 (a large amount of milk raw material and milk fluid).
(2-1) A milk raw material (MPC) (MPC4882, Fonterra Limited) was dissolved in warm water (60° C.), and MPC reductive liquid (milk fluid) (total solid content: 10% by mass, protein content: 8% by mass) was prepared at 60 kg.
(2-2) After adding activated carbon (granular, Shirasagi WH2C8/32, Osaka Gas Chemical Co., Ltd.) to the MPC reductive liquid (60° C.) at 0.4% by mass, the mixture was held stirred/mixed with a propeller-type stirring blade for about 20 minutes and under the contact treatment with activated carbon (adsorption) to prepare an MPC reductive liquid (activated carbon) (activated carbon was added at a ratio corresponding to 5% by mass based on the protein content).
(2-3) The MPC reductive liquid (activated carbon) was filtered through a sieve (metal filter, opening: 80 mesh) to separate the MPC reductive liquid (activated carbon) and the activated carbon to prepare an MPC reductive liquid (activated carbon, 5% by mass).

(2-4) The MPC reductive liquid (activated carbon, 5% by mass) was spray-dried (blow air temperature: 180° C., exhaust air temperature: 80° C.) to prepare MPC powder (activated carbon, 5% by mass).

(2-5) The MPC powder (activated carbon, 5% by mass) was dissolved so as to have the same Brix as that of the untreated MPC reductive liquid to prepare a reductive liquid (Brix: 10%) of the MPC powder (activated carbon, 5% by mass).

Flavor of MPC reductive liquid (activated carbon, 5% by mass) (Brix: 10%) obtained through the above steps (2-1) to (2-5) and the reductive liquid (Brix: 10%) of the MPC powder (activated carbon, 5% by mass) was examined by 10 members of the specialized panel.

From the results of the above-mentioned examination of flavor, 10 members (all) of the specialized panel evaluated that any of the above-mentioned MPC reductive liquids (activated carbon, 5% by mass) (Brix: 10%) after the contact treatment with activated carbon and the reductive liquid (Brix: 10%) of the MPC powder (activated carbon, 5% by mass) after the spray drying treatment, which were obtained through the above-mentioned steps (2-1) to (2-5), had an improved refreshing feeling, a reduced protein odor and a reduced reductive odor as compared with the untreated MPC reductive liquid (Brix: 10%).

Test Example 3

Changes in the Aroma Component of the Reductive Liquid (High-Protein Milk Fluid) of Milk Protein Concentrate (MPC) by Contact Treatment with Activated Carbon (Adsorption)

This test was conducted as follows. In this test, changes in aroma components (flavor substances) of the untreated MPC reductive liquid, and the MPC reductive liquid (activated carbon) and the reductive liquid of the MPC powder (activated carbon) prepared in Test Example 2 were evaluated.

(3-1) As a sample for measuring the aroma components, an untreated MPC reductive liquid (Brix: 5%), an MPC reductive liquid (activated carbon, 5% by mass) (Brix: 5%), and a reductive liquid (Brix: 5%) of an MPC powder (activated carbon, 5% by mass) were prepared (adjusting the refractive sugar content of each sample to 5%). These samples (volume: 8 mL) and sodium chloride (weight: 3 g) were charged in a vial (volume: 20 mL). Methyl isobutyl ketone (MIBK) was added to the vial as an internal standard substance, and then the vial was sealed.

(3-2) The vial was heated at 60° C. for 40 minutes.

(3-3) The "aroma (smell) components" of the headspace of the vial were extracted by solid phase microfiber (50/30 μm DVB/CAR/PDMS).

(3-4) The solid-phase microfiber was analyzed by a gas chromatograph mass spectrometer (GC/MS, column: DB-WAX UI).

(3-5) The area value of the aroma components was specified by the solid phase microextraction method (SPME method), and based on the ratio (relative value) of change of the aroma components after the contact treatment with activated carbon compared to that before the contact treatment with activated carbon, the behavior of change in the aroma components associated with the contact treatment with activated carbon was evaluated. Here, the solid phase microextraction method is a technique capable of rapidly analyzing volatile aroma components with high sensitivity.

As items for evaluation of the aroma components, dimethyl disulfide (Dimethyl Disulfide: DMDS, indicator of protein deterioration), nonanal (Nonanal, indicator of lipid deterioration), pentanal (Pentanal, indicator of grass odor), and pentanol (Pentanol, indicator of grass odor) were selected.

After setting the area value of dimethyl disulfide for the untreated MPC reductive liquid (Brix: 5%) by the SPME method to 1, the ratio of change (relative value) of the area value of dimethyl disulfide by the SPME method was calculated for the MPC reductive liquid (activated carbon, 5% by mass) (Brix: 5%) and the reductive liquid (Brix: 5%) of the MPC powder (activated carbon, 5% by mass). The results are shown in FIG. 1.

According to FIG. 1, the dimethyl disulfide content of the MPC reductive liquid (activated carbon, 5% by mass) (Brix: 5%) was changed (decreased) by 72% as compared with the untreated MPC reductive liquid (Brix: 5%). Further, according to FIG. 1, the dimethyl disulfide content of the reductive liquid (Brix: 5%) of the MPC powder (activated carbon, 5% by mass) was changed (decreased) by 67% as compared with the untreated MPC reductive liquid (Brix: 5%).

After setting the area value of nonanal for the untreated MPC reductive liquid (Brix: 5%) by the SPME method to 1, the ratio of change (relative value) of the area value of nonanal by the SPME method was calculated for the MPC reductive liquid (activated carbon, 5% by mass) (Brix: 5%) and the reductive liquid (Brix: 5%) of the MPC powder (activated carbon, 5% by mass). The results are shown in FIG. 2.

According to FIG. 2, the nonanal content of the MPC reductive liquid (activated carbon, 5% by mass) (Brix: 5%) was changed (decreased) by 38% as compared with the untreated MPC reductive liquid (Brix: 5%). Further, according to FIG. 2, the nonanal content of the reductive liquid (Brix: 5%) of the MPC powder (activated carbon, 5% by mass) was changed (decreased) by 35% as compared with the untreated MPC reductive liquid (Brix: 5%).

After setting the area value of pentanal for the untreated MPC reductive liquid (Brix: 5%) by the SPME method to 1, the ratio of change (relative value) of the area value of pentanal by the SPME method was calculated for the MPC reductive liquid (activated carbon, 5% by mass) (Brix: 5%) and the reductive liquid (Brix: 5%) of the MPC powder (activated carbon, 5% by mass). The results are shown in FIG. 3.

According to FIG. 3, the pentanal content of the MPC reductive liquid (activated carbon, 5% by mass) (Brix: 5%) was changed very little (changed (increased) by 5%) as compared with the untreated MPC reductive liquid (Brix: 5%). Further, according to FIG. 3, the pentanal content of the reductive liquid (Brix: 5%) of the MPC powder (activated carbon, 5% by mass) was changed very little (changed (decreased) by 8%) as compared with the untreated MPC reductive liquid (Brix: 5%).

After setting the area value of pentanol for the untreated MPC reductive liquid (Brix: 5%) by the SPME method to 1, the ratio of change (relative value) of the area value of pentanol by the SPME method was calculated for the MPC reductive liquid (activated carbon, 5% by mass) (Brix: 5%) and the reductive liquid (Brix: 5%) of the MPC powder (activated carbon, 5% by mass). The results are shown in FIG. 4.

According to FIG. 4, the pentanol content of the MPC reductive liquid (activated carbon, 5% by mass) (Brix: 5%) was changed (decreased) by 34% as compared with the untreated MPC reductive liquid (Brix: 5%). Further, according to FIG. 4, the pentanol content of the reductive liquid (Brix: 5%) of the MPC powder (activated carbon, 5% by mass) was changed (decreased) by 43% as compared with the untreated MPC reductive liquid (Brix: 5%).

From the above results, it was found that, when a high-protein milk fluid was prepared from a high-protein milk raw material and the high-protein milk fluid was subjected to treatment in contact with activated carbon, various aroma components changed in various ways. At this time, it was found, in particular, that when a high-protein milk fluid was prepared from a high-protein milk raw material and the high-protein milk fluid was subjected to treatment in contact with activated carbon, dimethyl disulfide was clearly changed (decreased).

Test Example 4

Changes in Nutritional Components of Milk Protein Concentrate (MPC) by Adsorption Treatment with Activated Carbon (Pilot Plant Scale Experiment) [1]

In this test, as in Test Example 2, the reductive liquid (milk fluid) (total solid content: 10% by mass) of the milk raw material (MPC) (MPC4882, Fonterra Limited) was subjected to treatment in contact with activated carbon (adsorption) (activated carbon was added at a ratio corresponding to 5% by mass based on the protein content) to prepare an MPC reductive liquid (activated carbon, 5% by mass). The MPC reductive liquid after the contact treatment with activated carbon was spray-dried to obtain MPC powder. This was used in the experiment. Regarding the MPC reductive liquid (milk fluid) before the contact treatment with activated carbon and the obtained MPC powder, typical nutritional components (total solid content, lipid, protein, carbohydrate (sugar), ash) were evaluated (analyzed) as described in (1) to (5) below, and the ratio of change in the nutritional components (degree of loss of nutritional components) of the MPC powder after the contact treatment with activated carbon was confirmed with respect to the reductive liquid (milk fluid) of the MPC before the contact treatment with activated carbon. The MPC powder was measured by the analysis method below, as reductive liquid (5% by weight).

(1) The concentration of the total solid content of the MPC reductive liquid (milk fluid) and the MPC powder was determined by weighing the sample (weight: about 3 g) on an aluminum weighing dish (bottom diameter: about 50 mm), evaporating most of the water content of the sample on a hot plate as necessary, holding in a dryer (temperature: 98-100° C.) till a constant weight, and then measuring the weight of the sample before and after these treatments.

(2) The lipid concentration of MPC reductive liquid (milk fluid) and MPC powder was measured and determined by the Gerber method (see "2 Lipids (3) Gerber Method" in "Analysis method of attached nutritional components, etc." corresponding to the details of the method listed in the third column of Attached Table 9 of Food Labeling Standards (2015 Cabinet Office Ordinance No. 10)).

(3) The protein concentration of the MPC reductive liquid (milk fluid) and the MPC powder was measured and determined by the Lowry method (see "Protein Quantification Method I" Chemistry and Biology, Vol. 4, No. 1, pp. 37-44, 1966).

(4) The ash concentration of the MPC reductive liquid (milk fluid) and the MPC powder was determined by weighing the sample (weight: about 3 g) in a crucible (bottom diameter: about 10 mm), evaporating most of the water content of the sample on a hot plate, holding in an electric furnace (temperature: 550-600° C.) till a constant weight, and then measuring the weight of the sample before and after these treatments.

(5) The carbohydrate (sugar) concentrations of the MPC reductive liquid (milk fluid) and the MPC powder were determined, respectively, by subtracting the lipid concentration, the protein concentration, and the ash concentration from the concentrations of the total solid content in the MPC reductive liquid (milk fluid) and the MPC powder.

[Test Results]

Regarding the MPC reductive liquid (milk fluid) before the contact treatment with activated carbon and the reductive liquid (5% by weight) of the MPC powder (after the contact treatment with activated carbon) which was obtained as described above, the ratio of change in the nutritional components (total solid content, lipid, protein, carbohydrate (sugar), ash) after the contact treatment with activated carbon compared to those before the contact treatment with activated carbon was confirmed by the above predetermined analysis method. The results are shown in FIG. 5.

According to FIG. 5, the ratio of change in the total solid content concentration of the MPC powder (solid high-protein milk raw material after the contact treatment with activated carbon) was increased by 2% (almost no change) as compared with the MPC reductive liquid (high-protein milk fluid before the contact treatment with activated carbon).

According to FIG. 5, the ratio of change in the lipid of the MPC powder (solid high-protein milk raw material after the contact treatment with activated carbon) was decreased by 10% (almost no change) as compared with the MPC reductive liquid (high-protein milk fluid before the contact treatment with activated carbon).

According to FIG. 5, the ratio of change in the protein of the MPC powder (solid high-protein milk raw material after the contact treatment with activated carbon) was increased by 3% (almost no change) as compared with the MPC reductive liquid (high-protein milk fluid before the contact treatment with activated carbon).

According to FIG. 5, the ratio of change in the carbohydrates (sugars) of the MPC powder (solid high-protein milk raw material after the contact treatment with activated carbon) was decreased by 14% (almost no change) as compared with the MPC reductive liquid (high-protein milk fluid before the contact treatment with activated carbon).

According to FIG. 5, the ratio of change in the ash of the MPC powder (solid high-protein milk raw material after the contact treatment with activated carbon) was increased by 2% (almost no change) as compared with the MPC reductive liquid (high-protein milk fluid before the contact treatment with activated carbon).

Test Example 5

Change in Salt Component of Milk Protein Concentrate (MPC) by Adsorption Treatment with Activated Carbon (Pilot Plant Scale Experiment) [1]

In this test, as in Test Example 2, the reductive liquid (milk fluid) (total solid content: 10% by mass) of the milk raw material (MPC) (MPC4882, Fonterra Limited) was subjected to treatment in contact with activated carbon (adsorption) (activated carbon was added at a ratio corresponding to 5% by mass based on the protein content) to prepare an MPC reductive liquid (activated carbon, 5% by mass). The MPC reductive liquid after the contact treatment with activated carbon was spray-dried to obtain MPC powder. This was used in the experiment. Regarding the MPC reductive liquid (milk fluid) before the contact treatment with activated carbon and the obtained MPC powder, typical salt components (Na, K, Mg, Ca, Cl, P) were evaluated (analyzed) as described in (1) and (2) below, and the ratio of change in the salt components (degree of loss of salt components) of the MPC powder after the contact treatment with activated carbon was confirmed with respect to the reductive liquid (milk fluid) of the MPC before the contact treatment with activated carbon. The MPC powder was measured by the predetermined analysis method below, as reductive liquid (S % by weight).

(1) The concentrations of sodium (Na), potassium (K), magnesium (Mg), calcium (Ca), and phosphorus (P) in the MPC reductive liquid (milk fluid) and MPC powder were measured and determined by high frequency inductively coupled plasma (Inductively Coupled Plasma ICP) emission spectroscopic analysis (see each of "10 Potassium (3) inductively coupled plasma emission analytical method", "11 calcium (3) inductively coupled plasma emission analytical method", "16 sodium (equivalent to salt) (3) inductively coupled plasma emission analytical method", and "21 phosphorus (3) inductively coupled plasma emission analytical method" in "Attached nutritional component analysis methods, etc." corresponding to the details of the methods listed in the third column of Attached Table 9 of Food Labeling Standards (2015 Cabinet Office Ordinance No. 10)).

(2) The chlorine (Cl) concentration of the MPC reductive liquid (milk fluid) and the MPC powder was measured and determined by the rotating electrode polarographic method.

[Test Results]

Regarding the MPC reductive liquid (milk fluid) before the contact treatment with activated carbon and the reductive liquid (5% by weight) of the MPC powder (after the contact treatment with activated carbon) which was obtained as described above, the ratio of change in the salt components (Na, K, Mg, Ca, Cl, P) after the contact treatment with activated carbon compared to those before the contact treatment with activated carbon was confirmed by the above predetermined analysis method. The results are shown in FIG. 6.

According to FIG. 6, the ratio of change in Na of the MPC powder (solid high-protein milk raw material after the contact treatment with activated carbon) was increased by 3% (almost no change) as compared with the MPC reductive liquid (high-protein milk fluid before the contact treatment with activated carbon).

According to FIG. 6, the ratio of change in K of the MPC powder (solid high-protein milk raw material after the contact treatment with activated carbon) was decreased by 1% (almost no change) as compared with the MPC reductive liquid (high-protein milk fluid before the contact treatment with activated carbon).

According to FIG. 6, the ratio of change in Mg of the MPC powder (solid high-protein milk raw material after the contact treatment with activated carbon) was increased by 3% (almost no change) as compared with the MPC reductive liquid (high-protein milk fluid before the contact treatment with activated carbon).

According to FIG. 6, the ratio of change in Ca of the MPC powder (solid high-protein milk raw material after the contact treatment with activated carbon) was increased by 4% (almost no change) as compared with the MPC reductive liquid (high-protein milk fluid before the contact treatment with activated carbon).

According to FIG. 6, the ratio of change in Cl of the MPC powder (solid high-protein milk raw material after the contact treatment with activated carbon) was increased by 37% as compared with the MPC reductive liquid (high-protein milk fluid before the contact treatment with activated carbon).

According to FIG. 6, the ratio of change in P of the MPC powder (solid high-protein milk raw material after the contact treatment with activated carbon) was increased by 2% (almost no change) as compared with the MPC reductive liquid (high-protein milk fluid before the contact treatment with activated carbon).

Test Example 6

Contact Treatment 2 with Activated Carbon (Adsorption) of Reductive Liquid (High-Protein Milk Fluid) of Milk Protein Concentrate (MPC) [2]

This test was conducted as follows.

(6-1) A milk raw material (MPC) (MPC6631, Fonterra Limited) which is different from that in Test Example 2 was dissolved in warm water (60° C.), and the MPC reductive liquid (milk fluid) (total solid content: 10% by mass, protein content: 8% by mass) was prepared at 60 kg.

(6-2) After adding activated carbon (granular, Shirasagi WH2C8/32, Osaka Gas Chemical Co., Ltd.) to the MPC reductive liquid (60° C.) at 0.4% by weight, the mixture was held stirred/mixed with a propeller-type stirring blade for about 20 minutes and subjected to treatment in contact with activated carbon (adsorption) to prepare an MPC reductive liquid (activated carbon) (activated carbon was added at a ratio corresponding to 5% by weight based on the protein content).

(6-3) The MPC reductive liquid (activated carbon) was filtered through a sieve (metal filter, opening: 80 mesh) to separate the MPC reductive liquid (activated carbon) and the activated carbon to prepare an MPC reductive liquid (activated carbon, 5% by mass).

(6-4) The MPC reductive liquid (activated carbon, 5% by mass) was spray-dried (blow air temperature: 180° C., exhaust air temperature: 80° C.) to prepare MPC powder (activated carbon, 5% by mass).

(6-5) The MPC powder (activated carbon, 5% by mass) was dissolved so as to have the same Brix as that of the untreated MPC reductive liquid to prepare a reductive liquid (Brix: 10%) (total solid content: 7% by mass) of MPC powder (activated carbon, 5% by mass).

Flavor of the MPC reductive liquid (activated carbon) (activated carbon, 5% by mass) obtained through the above steps (6-1) to (6-5) was examined by 5 members of the specialized panel.

From the results of the above-mentioned examination of flavor, 10 members (all) of the specialized panel evaluated that the above-mentioned MPC reductive liquid (activated carbon) (Brix: 10%) after the contact treatment with activated carbon, which was obtained through the above steps (1-1) to (1-5), had an improved refreshing feeling, a reduced protein odor and a reduced reductive odor as compared with the untreated MPC reductive liquid (Brix: 10%). Therefore, it was found that even a milk raw material different from Test Example 2 has the same effect as Test Example 2.

Test Example 7

Changes in the Aroma Component of the Reductive Liquid (High-Protein Milk Fluid) of Milk Protein Concentrate (MPC) by Contact Treatment with Activated Carbon (Adsorption) [2]

In this test, changes in aroma components (flavor substances) of the untreated MPC reductive liquid and the reductive liquid of the powder (activated carbon) of MPC prepared in Test Example 6 (MPC (MPC6631, Fonterra Limited) was used as a milk raw material) was evaluated.

- (7-1) As a sample for measuring the aroma components, an untreated MPC reductive liquid (Brix: 5%), and a reductive liquid (Brix: 5%) of an MPC powder (activated carbon, 5% by mass) were prepared (adjusting the refractive sugar content of each sample to 5%). These samples (volume: 8 mL) and sodium chloride (weight: 3 g) were charged in a vial (volume: 20 mL). Methyl isobutyl ketone (MIBK) was added to the vial as an internal standard substance, and then the vial was sealed.
- (7-2) The vial was heated at 60° C. for 40 minutes.
- (7-3) The "aroma (smell) components" of the headspace of the vial were extracted by solid phase microfiber (50/30 μm DVB/CAR/PDMS).
- (7-4) The solid-phase microfiber was analyzed by a gas chromatograph mass spectrometer (GC/MS, column: DB-WAX UI).
- (7-5) The area value of the aroma components was specified by the solid phase microextraction method (SPME method), and based on the ratio (relative value) of change of the aroma components after the contact treatment with the activated carbon compared to that before the contact treatment with the activated carbon, the behavior of change in the aroma components associated with the contact treatment with the activated carbon was evaluated.

As items for evaluation of the aroma components, dimethyl disulfide (Dimethyl Disulfide: DMDS, indicator of protein deterioration), nonanal (Nonanal, indicator of lipid deterioration), pentanal (Pentanal, indicator of grass odor), pentanol (1-Pentanol, indicator of grass odor) and aminoacetophenone (2-Aminoacetophenone, an indicator of alkaline casein odor) were selected.

After setting the area value of dimethyl disulfide for the untreated MPC reductive liquid (Brix: 5%) by the SPME method to 1, the ratio of change (relative value) of the area value of dimethyl disulfide by the SPME method was calculated for the reductive liquid (Brix: 5%) of the MPC powder (activated carbon, 5% by mass). The results are shown in FIG. 7.

According to FIG. 7, the dimethyl disulfide content of the reductive liquid (Brix: 5%) of the MPC powder (activated carbon, 5% by mass) was changed (decreased) by 68% as compared with the untreated MPC reductive liquid (Brix: 5%).

After setting the area value of nonanal for the untreated MPC reductive liquid (Brix: 5%) by the SPME method to 1, the ratio of change (relative value) of the area value of nonanal by the SPME method was calculated for the reductive liquid (Brix: 5%) of the MPC powder (activated carbon, 5% by mass). The results are shown in FIG. 8.

According to FIG. 8, the nonanal content of the reductive liquid (Brix: 5%) of the MPC powder (activated carbon, 5% by mass) was changed (decreased) by 33% as compared with the untreated MPC reductive liquid (Brix: 5%).

After setting the area value of pentanal for the untreated MPC reductive liquid (Brix: 5%) by the SPME method to 1, the ratio of change (relative value) of the area value of pentanal by the SPME method was calculated for the reductive liquid (Brix: 5%) of the MPC powder (activated carbon, 5% by mass). The results are shown in FIG. 9.

According to FIG. 9, the pentanal content of the reductive liquid (Brix: 5%) of the MPC powder (activated carbon, 5% by mass) was changed very little (changed (decreased) by 1%) as compared with the untreated MPC reductive liquid (Brix: 5%).

After setting the area value of pentanol for the untreated MPC reductive liquid (Brix: 5%) by the SPME method to 1, the ratio of change (relative value) of the area value of 1-pentanol by the SPME method was calculated for the reductive liquid (Brix: 5%) of the MPC powder (activated carbon, 5% by mass). The results are shown in FIG. 10.

According to FIG. 10, the 1-pentanol content of the reductive liquid (Brix: 5%) of the MPC powder (activated carbon, 5% by mass) was changed (increased) by 17% as compared with the untreated MPC reductive liquid (Brix: 5%).

After setting the area value of pentanol for the untreated MPC reductive liquid (Brix: 5%) by the SPME method to 1, the ratio of change (relative value) of the area value of aminoacetophenone by the SPME method was calculated for the reductive liquid (Brix: 5%) of the MPC powder (activated carbon, 5% by mass). The results are shown in FIG. 11.

According to FIG. 11, the aminoacetophenone content of the reductive liquid (Brix: 5%) of the MPC powder (activated carbon, 5% by mass) was changed (decreased) by 80% as compared with the untreated MPC reductive liquid (Brix: 5%).

From the above results, it was found that, when a high-protein milk fluid was prepared from a high-protein milk raw material and the high-protein milk fluid was subjected to treatment in contact with activated carbon, various aroma components changed in various ways. At this time, it was found, in particular, that when high-protein milk fluid was prepared from a high-protein milk raw material and the high-protein milk fluid was subjected to treatment in contact with activated carbon, dimethyl disulfide was clearly changed (decreased) even if the milk raw material was different from that of Test Example 3.

Test Example 81

Changes in Nutritional Components of Milk Protein Concentrate (MPC) by the Adsorption Treatment with Activated Carbon (Pilot Plant Scale Experiment) [2]

In this test, as in Test Example 2, the reductive liquid (milk fluid) (total solid content: 10% by mass) of the milk raw material (MPC) (MPC6631, Fonterra Limited) (milk raw material different from Test Example 4) was subjected to treatment in contact with activated carbon (adsorption) (activated carbon was added at a ratio corresponding to 5% by mass based on the protein content) to prepare an MPC reductive liquid (activated carbon, 5% by mass). The MPC reductive liquid after the contact treatment with the activated carbon was spray-dried to obtain MPC powder. This was used in the experiment. Regarding the MPC reductive liquid (milk fluid) before the contact treatment with the activated carbon and the obtained MPC powder, typical nutritional components (total solid content, lipid, protein, carbohydrate (sugar), ash) were evaluated (analyzed) as described in (1) to (5) of Test Example 4, and the ratio of change in the nutritional components (degree of loss of nutritional components) of the MPC powder after the contact treatment with the activated carbon was confirmed with respect to the reductive liquid (milk fluid) of the MPC before the contact treatment with the activated carbon. The MPC powder was measured by the predetermined analysis method of Test Example 4, as reductive liquid (5% by weight).

[Test Results]

Regarding the MPC reductive liquid (milk fluid) before the contact treatment with the activated carbon and the reductive liquid (5% by weight) of the MPC powder (after the contact treatment with the activated carbon) which was obtained as described above, the ratio of change in the nutritional components (total solid content, lipid, protein, carbohydrate (sugar), ash) after the contact treatment with the activated carbon compared to those before the contact treatment with the activated carbon was confirmed by the predetermined analysis method of Test Example 4. The results are shown in FIG. 12.

According to FIG. 12, the ratio of change in the total solid content concentration of the MPC powder (solid high-protein milk raw material after the contact treatment with the activated carbon) was increased by 1% (almost no change) as compared with the MPC reductive liquid (high-protein milk fluid before the contact treatment with the activated carbon).

According to FIG. 12, the ratio of change in the lipid of the MPC powder (solid high-protein milk raw material after the contact treatment with the activated carbon) was decreased by 11% (almost no change) as compared with the MPC reductive liquid (high-protein milk fluid before the contact treatment with the activated carbon).

According to FIG. 12, the ratio of change in the protein of the MPC powder (solid high-protein milk raw material after the contact treatment with the activated carbon) was increased by 2% (almost no change) as compared with the MPC reductive liquid (high-protein milk fluid before the contact treatment with the activated carbon).

According to FIG. 12, the ratio of change in the carbohydrates (sugars) of the MPC powder (solid high-protein milk raw material after the contact treatment with the activated carbon) was decreased by 8% (almost no change) as compared with the MPC reductive liquid (high-protein milk fluid before the contact treatment with the activated carbon).

According to FIG. 12, the ratio of change in the ash of the MPC powder (solid high-protein milk raw material after the contact treatment with the activated carbon) was increased by 3% (almost no change) as compared with the MPC reductive liquid (high-protein milk fluid before the contact treatment with the activated carbon).

Test Example 9

Changes in Salt Components of Milk Protein Concentrate (MPC) by the Adsorption Treatment with Activated Carbon (Pilot Plant Scale Experiment) [2]

In this test, as in Test Example 2, the reductive liquid (milk fluid) (total solid content: 10% by mass) of the milk raw material (MPC) (MPC6631, Fonterra Limited) (milk raw material different from Test Example 5) was subjected to treatment in contact with activated carbon (adsorption) (activated carbon was added at a ratio corresponding to 5% by mass based on the protein content) to prepare an MPC reductive liquid (activated carbon, 5% by mass). The MPC reductive liquid after the contact treatment with the activated carbon was spray-dried to obtain MPC powder. This was used in the experiment. Regarding the MPC reductive liquid (milk fluid) before the contact treatment with the activated carbon and the obtained MPC powder, typical salt components (Na, K, Mg, Ca, Cl, P) were evaluated (analyzed) as described in (1) and (2) of Test Example 5, and the ratio of change in the salt components (degree of loss of salt components) of the MPC powder after the contact treatment with the activated carbon was confirmed with respect to the reductive liquid (milk fluid) of the MPC before the contact treatment with the activated carbon. The MPC powder was measured by the predetermined analysis method of Test Example 5, as reductive liquid (5% by weight).

[Test Results]

Regarding the MPC reductive liquid (milk fluid) before the contact treatment with the activated carbon and the reductive liquid (5% by weight) of the MPC powder (after the contact treatment with the activated carbon) which was obtained as described above, the ratio of change in the salt components (Na, K, Mg, Ca, Cl, P) after the contact treatment with the activated carbon compared to those before the contact treatment with the activated carbon was confirmed by the above predetermined analysis method. The results are shown in FIG. 13.

According to FIG. 13, the ratio of change in Na of the MPC powder (solid high-protein milk raw material after the contact treatment with the activated carbon) was increased by 16% as compared with the MPC reductive liquid (high-protein milk fluid before the contact treatment with the activated carbon).

According to FIG. 13, the ratio of change in K of the MPC powder (solid high-protein milk raw material after the contact treatment with the activated carbon) was increased by 1% (almost no change) as compared with the MPC reductive liquid (high-protein milk fluid before the contact treatment with the activated carbon).

According to FIG. 13, the ratio of change in Mg of the MPC powder (solid high-protein milk raw material after the contact treatment with the activated carbon) was increased by 4% (almost no change) as compared with the MPC reductive liquid (high-protein milk fluid before the contact treatment with the activated carbon).

According to FIG. 13, the ratio of change in Ca of the MPC powder (solid high-protein milk raw material after the contact treatment with the activated carbon) was increased by 5% (almost no change) as compared with the MPC reductive liquid (high-protein milk fluid before the contact treatment with the activated carbon).

According to FIG. 13, the ratio of change in Cl of the MPC powder (solid high-protein milk raw material after the contact treatment with the activated carbon) was increased by 22% as compared with the MPC reductive liquid (high-protein milk fluid before the contact treatment with the activated carbon).

According to FIG. 13, the ratio of change in P of the MPC powder (solid high-protein milk raw material after the contact treatment with the activated carbon) was increased by 5% (almost no change) as compared with the MPC reductive liquid (high-protein milk fluid before the contact treatment with the activated carbon).

Test Example 10

Contact Treatment 1-1 with Activated Carbon (Adsorption) of Reductive Liquid (High-Protein Milk Fluid) of Milk Protein Concentrate (MPC)

This test was conducted as follows. In Test Example 1, the activated carbon for contact was added at a ratio corresponding to 5% by mass, 10% by mass, or 15% by mass with respect to the protein in the MPC reductive liquid (milk fluid), while in this Test Example, the activated carbon for contact was added at a ratio corresponding to 0.25% by mass, 0.5% by mass, 1.0% by mass, 1.25% by mass, 2.5% by mass, and 5% by mass with respect to the protein in the MPC reductive liquid (milk fluid).

(10-1) Milk raw material (MPC) (MPC4850, Fonterra Limited) was dissolved in warm water (60° C.), and the MPC reductive liquid (milk fluid) (total solid content: 10% by mass, protein content: 8% by mass) was prepared at 1500 g.

(10-2) The MPC reductive liquid (60° C.) was divided into 6 aliquots each at 200 g.

(10-3) After adding activated carbon (granular, Shirasagi WH2C8/32, Osaka Gas Chemical Co., Ltd.) at 0.02, 0.04, 0.08, 0.1, 0.2 and 0.4% by mass to each aliquot of the MPC reductive liquid (60° C.), and each of the mixtures was held stirred/mixed with a stirrer for about 20 minutes and under treatment in contact with activated carbon (adsorption) to prepare 6 reductive liquid of the MPC (activated carbon) (activated carbon was added at a ratio corresponding to 0.25% by mass, 0.5% by mass, 1.0% by mass, 1.25% by mass, 2.5% by mass, and 5% by mass based on the protein content).

(10-4) Each aliquot of the MPC reductive liquid (activated carbon) was filtered through a sieve (metal filter, opening: 80 mesh) to separate the MPC reductive liquid (activated carbon) and the activated carbon to prepare the MPC reductive liquid (activated carbon, 0.25% by mass, 0.5% by mass, 1.0% by mass, 1.25% by mass, 2.5% by mass, and 5% by mass).

Flavor of MPC reductive liquid (activated carbon) (Brix: 10%) (6 types: "activated carbon, 0.25% by mass", "activated carbon, 0.5% by mass", "activated carbon, 1.0% by mass", "activated carbon, 1.25% by mass", "activated carbon, 2.5% by mass", and "activated carbon, 5% by mass") obtained through the above steps (10-1) to (10-4) was examined by 10 members of the specialized panel.

From the results of the above-mentioned examination of flavor, 10 members (all) of the specialized panel evaluated that any of the above-mentioned MPC reductive liquid after the contact treatment with the activated carbon had an improved refreshing feeling, a reduced protein odor and a reduced reductive odor as compared with the untreated MPC reductive liquid (Brix: 10%): the MPC reductive liquid (activated carbon) (Brix: 10%) (6 types: 0.25% by mass, 0.5% by mass, LO % by mass, 1.25% by mass, 2.5% by mass, and 5% by mass of the amount of activated carbon used during the contact treatment with activated carbon of the milk fluid, based on the protein content in the milk fluid (based on the content of protein contained in the milk fluid)) were obtained by the above-mentioned steps (10-1) to (10-4). They also evaluated that among these, especially 4 types with the amount of 1.0% by mass or more used had an improved refreshing feeling, a reduced protein odor and a reduced reductive odor.

Test Example 11

Evaluation in Coffee Beverage

The raw materials listed in Table 1 below were mixed, filled in a container and sealed, and then sterilized at 121° C. for 20 minutes to produce milk coffee beverage.

TABLE 1

Composition of coffee beverage (untreated and activated carbon treated MPC)
(Unit of the following values: % by mass)

| Raw materials | Untreated (control) | Activated carbon treated |
|---|---|---|
| Milk (sterilized) | 14.00 | 14.00 |
| Milk protein condensate (MPC) | 10.40 | 10.40 |
| Saccharose | 6.40 | 6.40 |
| Whole milk powder | 0.94 | 0.94 |
| Coffee extract Colombia OH-1 (Ogawa & Co., Ltd.) | 2.80 | 2.80 |
| Sugar ester P1670 (Mitsubishi-Chemical Foods Corporation) | 0.08 | 0.08 |
| Sodium hydrogen carbonate | 0.10 | 0.10 |
| Ion exchanged water | 65.28 | 65.28 |

*Retort sterilization conditions: 121° C., 20 minutes

The flavor of each beverage obtained above was examined by 5 members of the specialized panel.

The 5 members (all) of the specialized panel evaluated that the coffee beverages containing solid MPC (activated carbon, 5% by mass of protein) obtained by the method of the present invention had a hardly-sensed protein odor and a reductive odor and imparted more feeling of a preferable flavor of coffee beverage as compared with that containing the untreated MPC reductive liquid.

In addition, although not described in detail like coffee beverage, gel foods (puddings, etc.), liquid foods (milk beverages, liquid foods, etc.), frozen foods (ice creams, etc.), solid/powder foods (powdered beverages, etc.) were evaluated, and they were also evaluated as imparting more feeling of a favorable flavor for each food as in the case of coffee beverage.

That is, the milk raw material obtained by the method of the present invention has an improved refreshing feeling, and thus is found out to be capable of enhancing the amount of protein in food while maintaining a preferable flavor without impairing the original flavor of the blended food.

The invention claimed is:

1. A method for producing a liquid high-protein milk raw material, comprising:
    a step of preparing a high-protein milk fluid having a protein content of 60% by mass or more in the total solid content from a milk raw material, and
    a step of subjecting the milk fluid to treatment in contact with activated carbon,
    wherein the amount of the activated carbon used for subjecting the high-protein milk fluid to treatment in contact with the activated carbon is 1% by mass or more with respect to the content of protein in the milk fluid,
    wherein the milk raw material produced by the production method has an improved refreshing feeling and a reduced protein odor,
    wherein the milk raw material produced by the production method has a change ratio in dimethyl disulfide content of 20 to 90%, compared with the high-protein milk fluid after adjusting a refractive sugar content to the same,
    wherein the milk raw material produced by the production method has a change ratio in nonanal content of 5 to 60%, compared with the high-protein milk fluid after adjusting the refractive sugar content to the same, wherein the milk raw material produced by the production method has a change ratio in pentanol content of 5 to 60%, compared with the high-protein milk fluid after adjusting the refractive sugar content to the same, and wherein the milk raw material produced by the production method has a change ratio in pentanal content of 0 to 40%, compared with the high-protein milk fluid after adjusting the refractive sugar content to the same.

2. The method for producing a milk raw material according to claim 1, wherein the milk raw material used for preparing the high-protein milk fluid has a protein content of 60% by mass or more in the total solid content.

3. The method for producing a milk raw material according to claim 1, wherein a concentration of the total solid content in the high-protein milk fluid is 2 to 20% by mass.

4. The method for producing a milk raw material according to claim 1, wherein a concentration of protein in the high-protein milk fluid is 1.5 to 18% by mass.

5. The method for producing a milk raw material according to claim 1, wherein the liquid high-protein milk raw material is a liquid milk protein concentrate (MPC) or a liquid whey protein concentrate (WPC).

6. A method for producing a solid high-protein milk raw material obtained through a drying treatment, comprising: a step of further subjecting the liquid high-protein milk raw material produced by the production method according to claim 1 to the drying treatment.

7. The method for producing a milk raw material according to claim 6, wherein the solid high-protein milk raw material is a solid milk protein concentrate (MPC) or a solid whey protein concentrate (WPC).

8. A method for improving a refreshing feeling, reducing a protein odor, and reducing miscellaneous taste of a milk raw material, comprising: preparing a high-protein milk fluid having a protein content of 60% by mass or more in the total solid content from the milk raw material, and subjecting the milk fluid to treatment in contact with activated carbon to obtain a liquid high-protein milk raw material, wherein the amount of the activated carbon used for subjecting the high-protein milk fluid to treatment in contact with the activated carbon is 1% by mass or more with respect to the content of protein in the milk fluid, wherein the milk raw material produced by the method has a change ratio in dimethyl disulfide content of 20 to 90%, compared with the high-protein milk fluid after adjusting a refractive sugar content to the same, wherein the milk raw material produced by the method has a change ratio in nonanal content of 5 to 60%, compared with the high-protein milk fluid after adjusting the refractive sugar content to the same, wherein the milk raw material produced by the method has a change ratio in pentanol content of 5 to 60%, compared with the high-protein milk fluid after adjusting the refractive sugar content to the same, wherein the milk raw material produced by the method has a change ratio in pentanal content of 0 to 40%, compared with the high-protein milk fluid after adjusting the refractive sugar content to the same.

9. A method for improving a refreshing feeling, reducing a protein odor, and reducing dimethyl disulfide content of a milk raw material, comprising: preparing a high-protein milk fluid having a protein content of 60% by mass or more in the total solid content from the milk raw material, and subjecting the milk fluid to treatment in contact with activated carbon and then to drying treatment to obtain a solid high-protein milk raw material, wherein the amount of the activated carbon used for subjecting the high-protein milk fluid to treatment in contact with the activated carbon is 1% by mass or more with respect to the content of protein in the milk fluid, wherein the milk raw material produced by the method has a change ratio in dimethyl disulfide content of 20 to 90%, compared with the high-protein milk fluid after adjusting a refractive sugar content to the same, wherein the milk raw material produced by the method has a change ratio in nonanal content of 5 to 60%, compared with the high-protein milk fluid after adjusting the refractive sugar content to the same, wherein the milk raw material produced by the method has a change ratio in pentanol content of 5 to 60%, compared with the high-protein milk fluid after adjusting the refractive sugar content to the same, wherein the milk raw material produced by the method has a change ratio in pentanal content of 0 to 40%, compared with the high-protein milk fluid after adjusting the refractive sugar content to the same.

10. A method for producing a food or drink, comprising a step of including the milk raw material produced by the production method according to claim 1 in the food or drink.

11. The method for producing a food or drink according to claim 10, wherein the food or drink is sterilized.

12. The method for producing a food or drink according to claim 10, wherein the food or drink is packed in a container.

13. A food or drink containing the milk raw material produced by the production method according to claim 1.

14. The food or drink according to claim 13, wherein the food or drink is sterilized.

15. The food or drink according to claim 13, wherein the food or drink is packed in a container.

16. The method according to claim 1, wherein the milk fluid is prepared by dissolving a solid milk raw material in cold water or warm water.

17. The method according to claim 16, wherein the solid milk raw material is selected from the group consisting of a powder of milk protein concentrate, a powder of whey protein concentrate, a powder of whey protein isolate, and a powder of caseinate.

18. The method according to claim 8, wherein the milk fluid is prepared by dissolving a solid milk raw material in cold water or warm water.

19. The method according to claim 18, wherein the solid milk raw material is selected from the group consisting of a powder of milk protein concentrate, a powder of whey protein concentrate, a powder of whey protein isolate, and a powder of caseinate.

20. The method according to claim 9, wherein the milk fluid is prepared by dissolving a solid milk raw material in cold water or warm water.

21. The method according to claim 20, wherein the solid milk raw material is selected from the group consisting of a powder of milk protein concentrate, a powder of whey protein concentrate, a powder of whey protein isolate, and a powder of caseinate.

22. The method according to claim 1, wherein the amount of the activated carbon used for subjecting the high-protein milk fluid to treatment in contact with the activated carbon is 1 to 10% by mass with respect to the content of protein in the milk fluid.

23. The method according to claim 8, wherein the amount of the activated carbon used for subjecting the high-protein milk fluid to treatment in contact with the activated carbon is 1 to 10% by mass with respect to the content of protein in the milk fluid.

24. The method according to claim 9, wherein the amount of the activated carbon used for subjecting the high-protein milk fluid to treatment in contact with the activated carbon is 1 to 10% by mass with respect to the content of protein in the milk fluid.

\* \* \* \* \*